United States Patent
Tsunoda et al.

(10) Patent No.: US 12,389,114 B2
(45) Date of Patent: Aug. 12, 2025

(54) IMAGE PICKUP DEVICE CAPABLE OF PERFORMING IMAGE PICKUP IN A PLURALITY OF IMAGE-PICKUP MODES IN PARALLEL AND CONTROL METHOD THEREOF

(71) Applicant: CANON KABUSHIKI KAISHA, Tokyo (JP)

(72) Inventors: Masayoshi Tsunoda, Kanagawa (JP); Satoru Matsumoto, Tokyo (JP); Nari Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 18/298,463

(22) Filed: Apr. 11, 2023

(65) Prior Publication Data

US 2023/0345121 A1    Oct. 26, 2023

(30) Foreign Application Priority Data

Apr. 21, 2022   (JP) .................................. 2022-070161

(51) Int. Cl.
*H04N 23/667* (2023.01)
*H04N 23/63* (2023.01)
*H04N 23/69* (2023.01)
*H04N 23/698* (2023.01)

(52) U.S. Cl.
CPC ......... *H04N 23/667* (2023.01); *H04N 23/632* (2023.01); *H04N 23/633* (2023.01); *H04N 23/69* (2023.01); *H04N 23/698* (2023.01)

(58) Field of Classification Search
CPC .. H04N 23/667; H04N 23/632; H04N 23/633; H04N 23/69; H04N 23/698; H04N 23/631
See application file for complete search history.

(56) References Cited

U.S. PATENT DOCUMENTS

| 2014/0192240 | A1* | 7/2014 | Laroia | H04N 5/265 |
| | | | | 348/262 |
| 2019/0289201 | A1* | 9/2019 | Nishimura | H04N 13/239 |
| 2022/0053142 | A1* | 2/2022 | Manzari | H04N 23/69 |

FOREIGN PATENT DOCUMENTS

JP           08-321981 A      12/1996

* cited by examiner

*Primary Examiner* — Mekonnen D Dagnew
(74) *Attorney, Agent, or Firm* — Cowan, Liebowitz & Latman, P.C.

(57) ABSTRACT

An image pickup device having a plurality of lenses with angles of view different from one another, includes at least one memory and at least one processor which function as: an accepting unit configured to accept a switching operation of switching a lens to be used for image pickup when an image is picked up in a first image-pickup mode and a second image-pickup mode in parallel; and a control unit configured to control such that the lens to be used for the image pickup is switched in response to an acceptance of the switching operation of the lens to be used for the image pickup, wherein the control unit controls such that lenses to be used in the first image-pickup mode and the second image-pickup mode are switched such that different lenses are used in the first image-pickup mode and the second image-pickup mode.

27 Claims, 12 Drawing Sheets

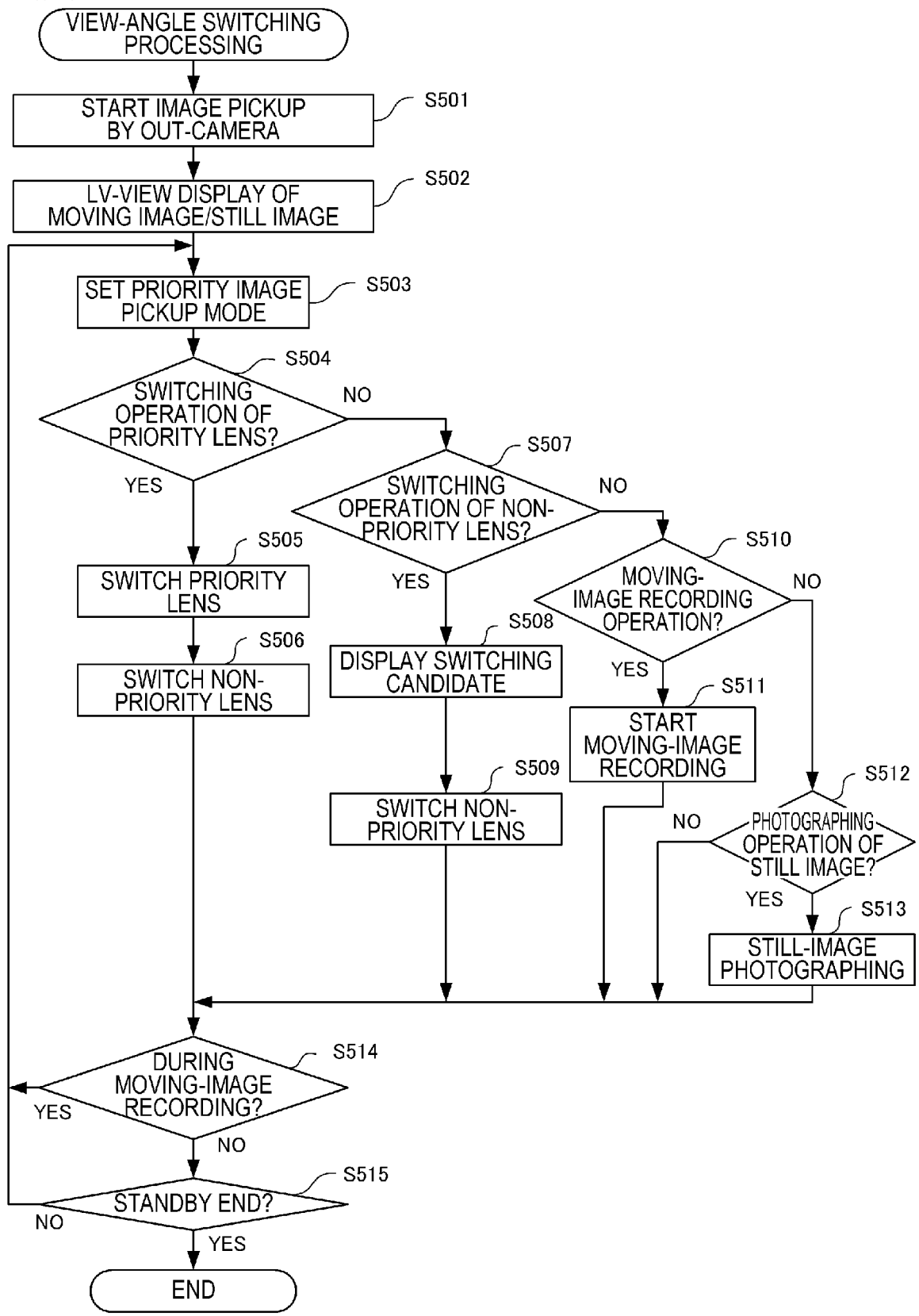

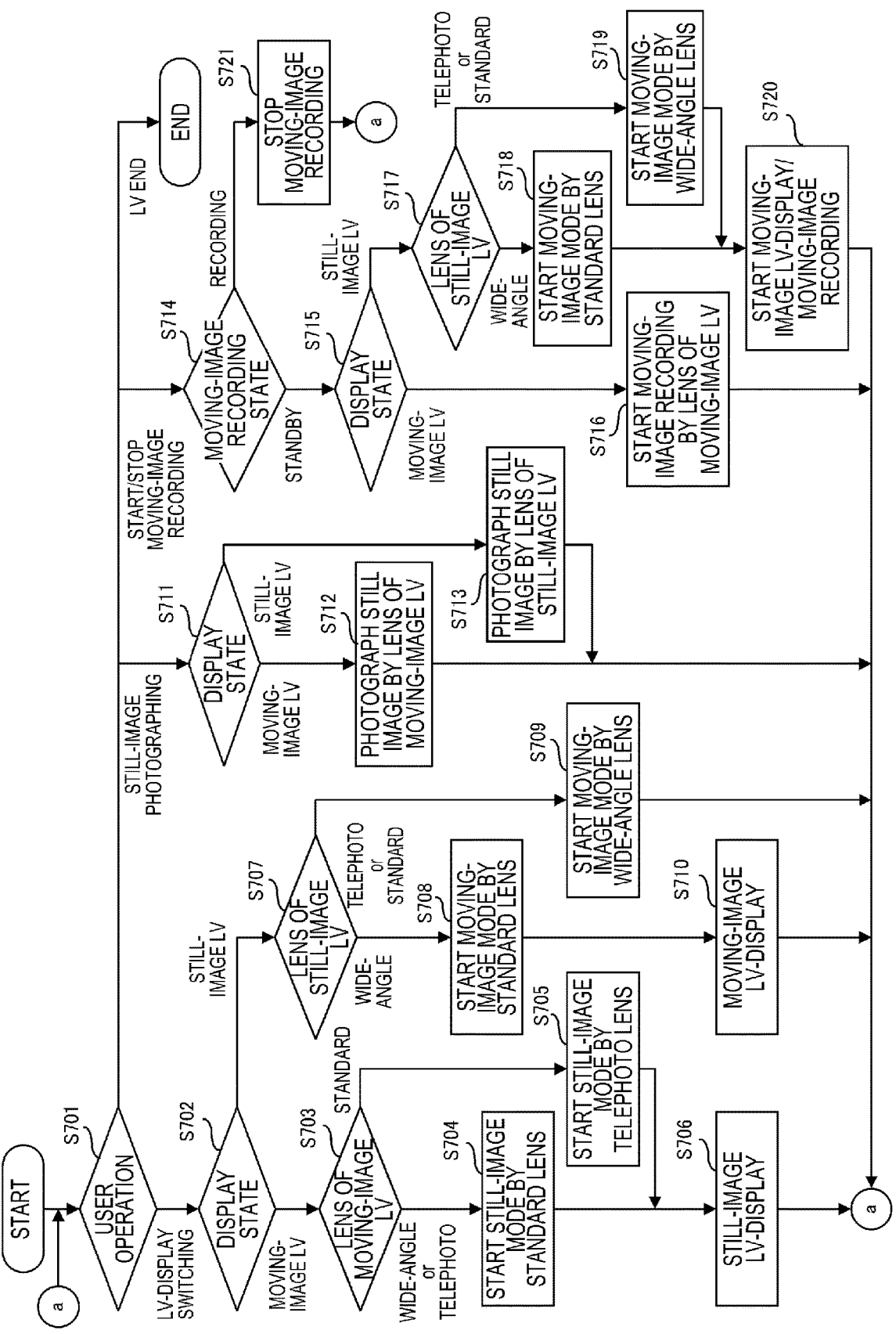

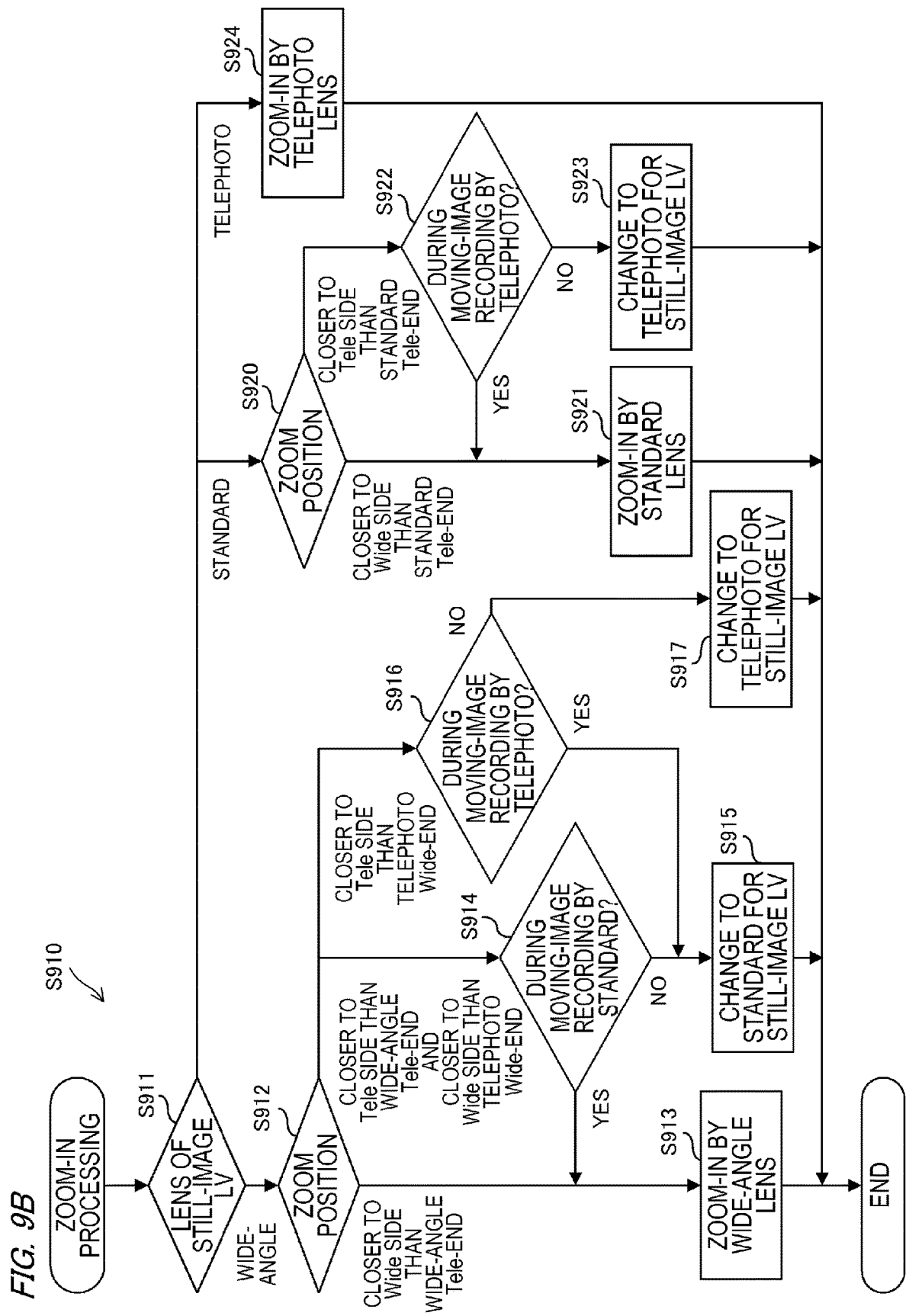

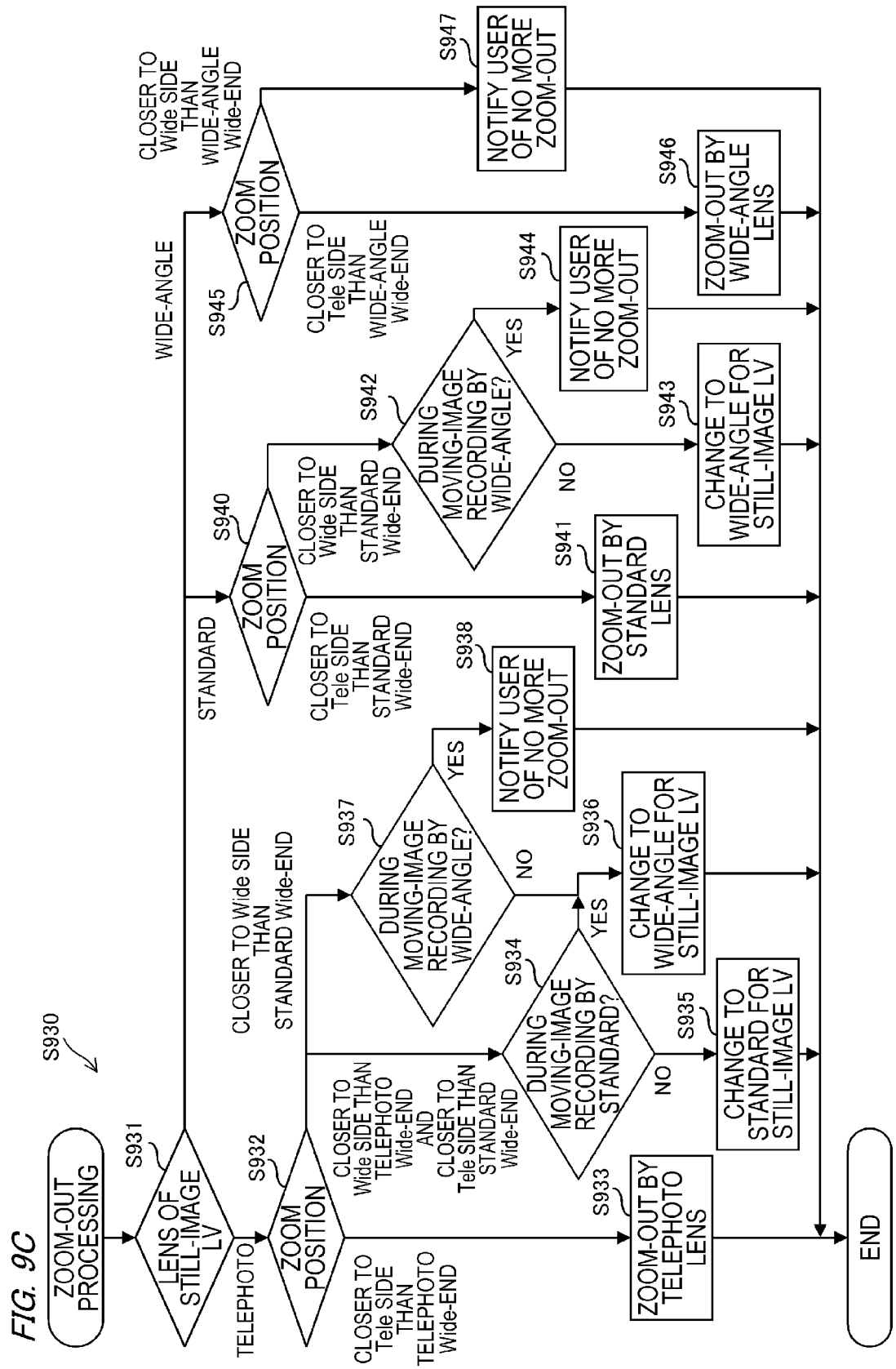

IMAGE PICKUP DEVICE CAPABLE OF PERFORMING IMAGE PICKUP IN A PLURALITY OF IMAGE-PICKUP MODES IN PARALLEL AND CONTROL METHOD THEREOF

BACKGROUND OF THE INVENTION

Field of the Invention

The present invention relates to an image pickup device and a control method of the image pickup device.

Description of the Related Art

Conventionally, an image pickup method of recording a subject by using both an image pickup unit for photographing a still image and an image pickup unit for photographing a moving image provided in an image pickup device at the same time is well known. Recently, in an image pickup device such as a smartphone, a plurality of image pickup units with different focal distances are mounted, whereby recording of a subject by each of the image pickup units at the same time is realized. Furthermore, when an angle of view is to be switched, the smartphone uses an image pickup unit with a focal distance to which the switching is to be performed.

A Japanese Patent Application Publication No. H08-321981 discloses an art of automatically moving a zoom position of an image pickup device for photographing a moving image in collaboration with a zoom operation of the image pickup device for photographing a still image.

In Japanese Patent Application Publication No. H08-321981, each image pickup device can switch to an arbitrary angle of view by performing an optical zoom by lens drive, respectively. On the other hand, in the smartphone, the angle of view is switched by using a plurality of image pickup units (lenses) with different focal distances. When image pickup is performed by the smartphone in two image-pickup modes for the still image and the moving image in parallel, in order to switch the lens in use for the still image to the lens for the moving image, the use of the image pickup unit for the still image should be stopped once and then, the angle of view for photographing the moving image is switched. Thus, it is difficult to adjust an angle of view seamlessly from a wide angle to telephoto without interrupting the image pickup.

SUMMARY OF THE INVENTION

The present invention provides an image pickup device which switches an angle of view seamlessly from a wide angle to telephoto without interrupting image pickup when image pickup is performed in a plurality of image-pickup modes in parallel.

The image pickup device of the present invention, which has a plurality of lenses with angles of view different from one another, includes at least one memory and at least one processor which function as: an accepting unit configured to accept a switching operation of switching a lens to be used for image pickup when an image is picked up in a first image-pickup mode and a second image-pickup mode in parallel; and a control unit configured to control such that the lens to be used for the image pickup is switched in response to an acceptance of the switching operation of the lens to be used for the image pickup, wherein the control unit controls such that lenses to be used in the first image-pickup mode and the second image-pickup mode are switched such that different lenses are used in the first image-pickup mode and the second image-pickup mode.

Further features of the present invention will become apparent from the following description of exemplary embodiments with reference to the attached drawings.

BRIEF DESCRIPTION OF THE DRAWINGS

FIG. 5 is a flowchart exemplifying the view-angle switching processing according to a second embodiment;
FIG. 7 is a flowchart exemplifying the LV-display switching processing according to the third embodiment;
FIG. 9B is a flowchart exemplifying details of the zoom-in processing;
FIG. 9C is a flowchart exemplifying details of the zoom-out processing.

DESCRIPTION OF THE EMBODIMENTS

Figure 1A:
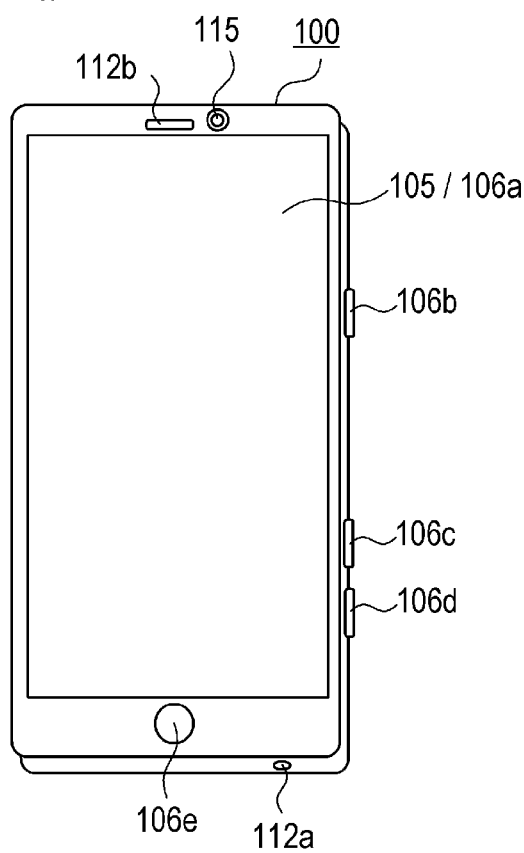
FIGS. 1A and 1B are appearance views of a smartphone.
Figure 1B:
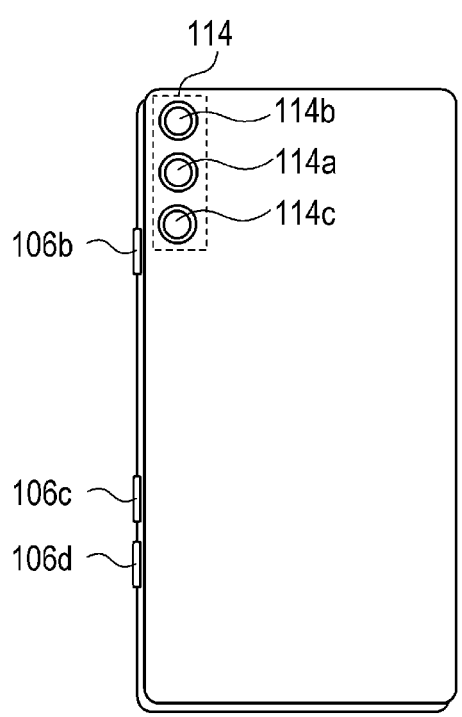

Hereinafter, embodiments of the present invention will be explained by referring to the drawings. FIGS. 1A and 1B are appearance views of a smartphone 100 as an example of an image pickup device (electronic device) to which the present invention can be applied. FIG. 1A is a front view of the smartphone 100, and FIG. 1B is a rear view of the smartphone 100.

A display 105 is a display unit which is provided on a front surface of the smartphone 100 and displays images and various types of information. A touch panel 106a is a touch-operation member configured integrally with the display 105, and the smartphone 100 can detect a touch operation to a display surface (operation surface) of the display 105 by using the touch panel 106a. The smartphone 100 is capable of live-view display (LV display) of an image picked up by an out-camera 114 or an in-camera 115 on the display 105. The LV display is display of an image shown on a substantially real time basis of a subject, and the LV-displayed image is called an LV-image. The out-camera 114 includes a telephoto lens 114a, a standard lens 114b, a wide-angle lens 114c, which will be described later, and the like.

A power button 106b is an operation button for switching lighting on/off of the display 105 and power on/off of the smartphone 100. For example, when a user presses down the power button 106b for a time shorter than a predetermined time (3 seconds, for example) (pressing down the power button 106b for a short time), lighting on/off of the display 105 is switched. When the user continues pressing-down on the power button 106b (pressing down the power button 106b for a long time), power on/off of the smartphone 100 is switched.

A sound-volume plus button 106c and a sound-volume minus button 106d are sound-volume buttons for adjusting a sound volume (volume) of a sound signal output from a sound output terminal 112a and a sound volume of sound output from a speaker 112b. When the sound-volume plus button 106c is pressed down, the sound volume becomes larger, while when the sound-volume minus button 106d is pressed down, the sound volume becomes smaller. In a photographing standby state when the camera is in use, the sound-volume plus button 106c and the sound-volume minus button 106d function as shutter buttons for instructing photographing.

The user can make arbitrary setting so that a specific function is performed when the power button 106b and the sound-volume minus button 106d are pressed down at the same time or when the sound-volume minus button 106d is pressed down quickly several times or the like.

A home button 106e is an operation button for causing a home screen to be displayed on the display 105. When the user started and is using various applications on the smartphone 100, the user can temporarily close the various started applications and cause the home screen to be displayed on the display 105 by pressing down the home button 106e. The home button 106e is assumed to be a button which can be physically pressed down in this embodiment, but it may be a touch button (display item) displayed on the display 105 and capable of the touch operation.

The sound output terminal 112a is an earphone jack and is a terminal which outputs a sound signal to an earphone, an external speaker or the like. A speaker 112b is a built-in speaker which outputs sound. For example, when the earphone, the external speaker or the like is connected to the sound output terminal 112a, the sound signal is output from the sound output terminal 112a. When the earphone, the external speaker or the like is not connected to the sound output terminal 112a, the sound is output from the speaker 112b.

Figure 2:
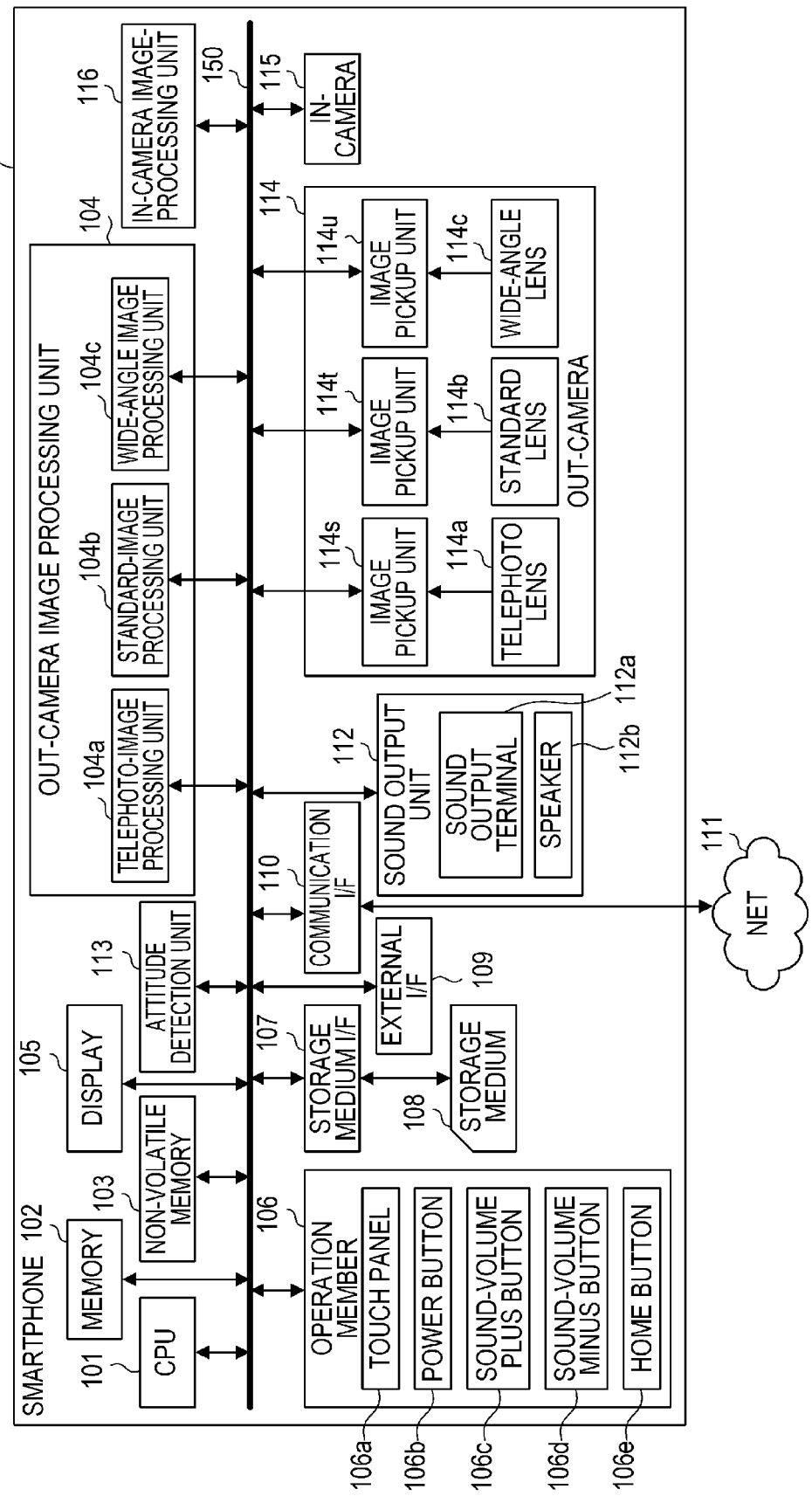
FIG. 2 is a block diagram illustrating a configuration of the smartphone.

FIG. 2 is a block diagram illustrating a configuration example of the smartphone 100. To an internal bus 150, a CPU 101, a memory 102, a non-volatile memory 103, an out-camera image processing unit 104, the display 105, an operation member 106, a storage medium I/F 107, an external I/F 109, and a communication I/F 110 are connected. Moreover, to the internal bus 150, a sound output unit 112, an attitude detection unit 113, the out-camera 114, the in-camera 115, and an in-camera image processing unit 116 are also connected. Each unit connected to the internal bus 150 can exchange data with each other through the internal bus 150.

The CPU 101 is a control unit which controls the entirety of the smartphone 100 and is constituted by at least one processor or a circuit. The memory 102 is constituted by a RAM (a volatile memory using a semiconductor element or the like), for example. The CPU 101 controls each unit of the smartphone 100 by using the memory 102 as a work memory in accordance with a program stored in the non-volatile memory 103, for example. In the non-volatile memory 103, data such as image data, sound data and others, various programs for the CPU 101 to operate and the like are stored. The non-volatile memory 103 is constituted by a flash memory, a ROM or the like, for example.

The out-camera 114 is a camera disposed on a rear surface (a surface on a side opposite to a surface on which the display 105 is provided) of the smartphone 100. In the example in FIG. 2, the out-camera 114 includes an image pickup unit 114s, an image pickup unit 114t, an image pickup unit 114u, a telephoto lens 114a, a standard lens 114b, and a wide-angle lens 114c. In this embodiment, it is assumed that, when the telephoto lens 114a is used, the image pickup unit 114s is used, when the standard lens 114b is used, the image pickup unit 114t is used, and when the wide-angle lens 114c is used, the image pickup unit 114u is used for image pickup, respectively. However, this configuration is not limiting, and it may be so configured that the out-camera 114 has an image pickup unit for a still image and an image pickup unit for a moving image, and photographing can be performed by switching among the telephoto lens, the standard lens, and the wide-angle lens in each of the image pickup units.

The image pickup unit 114s, the image pickup unit 114t, and the image pickup unit 114u are image pickup elements such as a CCD image sensor and a CMOS image sensor, and each of them performs photographing using the telephoto lens 114a, the standard lens 114b, and the wide-angle lens 114c. The out-camera 114 can perform three types of image pickup, that is, the image pickup using the telephoto lens 114a, the image pickup using the standard lens 114b, and the image pickup using the wide-angle lens 114c at the same time (in parallel or time division). It is needless to say that the out-camera 114 can perform only two types of the image pickup in the aforementioned three types of the image pickup at the same time or can perform only one type of the image pickup.

A focal distance of the telephoto lens 114a is longer than the focal distance of the standard lens 114b, and the image pickup using the telephoto lens 114a is the image pickup with more telephoto than the image pickup using the standard lens 114b. The focal distance of the wide-angle lens 114c is shorter than the focal distance of the standard lens 114b, and the image pickup using the wide-angle lens 114c is image pickup with a wider angle than the image pickup using the standard lens 114b. That is, the focal distance becomes shorter in the order of the telephoto lens 114a, the standard lens 114b, and the wide-angle lens 114c, and an angle of view (image pickup range) becomes wider with that. In this embodiment, a zoom magnification (focal distance) of the telephoto lens 114a is assumed to be a fixed value determined in advance but may be changed by the user.

The smartphone 100 according to this embodiment is capable of image pickup in a plurality of image-pickup modes, and images can be picked up by switching the lens by switching among the image pickup unit 114s, the image pickup unit 114t, and the image pickup unit 114u and by changing the angle of view in each of the image-pickup modes. The plurality of image-pickup modes are a still-image mode for photographing a still image and a moving-image mode for photographing a moving image, for example. When images are picked up in the still-image mode and the moving-image mode in parallel, the smartphone 100 performs photographing by using the different image pickup units in the respective image-pickup modes, that is, by using the different lenses.

The smartphone 100 switches the lens to be used (the telephoto lens 114a, the standard lens 114b, the wide-angle lens 114c) by switching among the image pickup unit 114s, the image pickup unit 114t, and the image pickup unit 114u in each image-pickup mode. In the following explanation, the description that the lens is switched means that the lens is switched by switching the image pickup unit.

The in-camera 115 is a camera disposed on the front surface (on the same surface as the surface on which the display 105 is provided) of the smartphone 100.

The image picked up by the out-camera 114 and the image picked up by the in-camera 115 can be both LV-displayed on the display 105. The user can select the camera by which the image was picked up to be LV-displayed on the display 105 by operating the touch panel 106a. For example, the user (photographer) selects the out-camera 114 when a sight just before the eyes is to be photographed and selects the in-camera 115 when the user himself/herself is to be photographed.

Moreover, when the image picked up by the out-camera 114 is to be LV-displayed on the display 105, the user can select the lens which was used to pick up the image to be LV-displayed on the display 105 by operating the touch panel 106a. When the user selects the telephoto lens 114a, an image enlarged more than the case in which the standard lens 114b was selected can be LV-displayed on the display 105. When the standard lens 114b is selected, an image with a wider angle than the case of selection of the telephoto lens 114a and enlarged more than the case of selection of the wide-angle lens 114c can be LV-displayed on the display 105. When the wide-angle lens 114c is selected, an image with a wider angle than the case of selection of the telephoto lens 114a or the standard lens 114b can be LV-displayed on the display 105.

The out-camera image processing unit 104 executes various types of image processing and subject-recognition processing by using the image picked up by the out-camera 114 on the basis of control of the CPU 101. The out-camera image processing unit 104 includes a telephoto-image processing unit 104a, a standard-image processing unit 104b, and a wide-angle image processing unit 104c. The telephoto-image processing unit 104a executes various types of image processing by using an image picked up by the telephoto lens 114a. The standard-image processing unit 104b executes various types of image processing by using an image picked up by the standard lens 114b. The wide-angle image processing unit 104c executes various types of image processing by using an image picked up by the wide-angle lens 114c. These three image processing units can operate at the same time (in parallel or time division).

In this embodiment, the configuration is such that the three image processing units corresponding to the three lenses, respectively, are used, but the number of lenses corresponding to one image processing unit is not particularly limited. One image processing unit may be used for two lenses, or one image processing unit may be used for three lenses. That is, the out-camera image processing unit 104 does not have to include a plurality of image processing units. In that case, too, the out-camera image processing unit 104 may be capable of executing a plurality of pieces of processing at the same time (in parallel or time division) by using each of the plurality of images.

The in-camera image processing unit 116 executes various types of image processing by using the image picked up by the in-camera 115 on the basis of the control of the CPU 101.

Each image processing unit can execute various types of image processing by using images stored in the non-volatile memory 103 and a storage medium 108, the images obtained through the external I/F 109, the images obtained through the communication I/F 110 and the like. The image processing executed by each image processing unit includes A/D conversion processing, D/A conversion processing, encoding processing of image data, compression processing, decoding processing, enlargement/reduction processing (resize), noise reduction processing, color conversion processing and the like. Each of the image processing units may be configured by a dedicated circuit block for executing specific image processing. Moreover, depending on the type of the image processing, the CPU 101 can execute the image processing in accordance with a program without using the various image processing units.

The display 105 displays an image, a GUI screen configuring GUI (Graphical User Interface) and the like on the basis of the control of the CPU 101. The CPU 101 generates a display control signal in accordance with the program and controls each unit of the smartphone 100 so that an image signal for displaying on the display 105 is generated and output to the display 105. The display 105 displays an image on the basis of the output image signal. As a configuration included in the smartphone 100 itself, it may be up to the interface for outputting the image signal for displaying on the display 105, and the display 105 may be configured by an external monitor (TV or the like).

The operation member 106 is an input device for accepting an operation by the user. The operation member 106 includes a character-information input device such as a keyboard, a pointing device such as a mouse and a touch panel, a button, a dial, a joystick, a touch sensor, a touch pad and the like. The operation member 106 includes operation members such as the touch panel 106a, the power button 106b, the sound-volume plus button 106c, the sound-volume minus button 106d, the home button 106e and the like described above.

The storage medium I/F 107 has the storage medium 108 such as a memory card, a CD, and a DVD detachably attached and executes reading of data from the attached storage medium 108 and writing of data in the storage medium 108 on the basis of the control of the CPU 101. The storage medium 108 may be a built-in storage incorporated in the smartphone 100. The external I/F 109 is an interface for performing input/output of an image signal and a sound signal by connecting to the external equipment via a wired cable or wirelessly. The communication I/F 110 is an interface for performing transmission/reception of various types of data such as a file and a command by communicating with the external equipment, the Internet 111 and the like.

The sound output unit 112 outputs sound of the moving image data and music data, operation sounds, a ringtone, various notification sounds and the like. The sound output unit 112 includes the sound output terminal 112a and the speaker 112b described above. The sound output unit 112 may output sound via wireless communication.

The attitude detection unit 113 detects an attitude (inclination) of the smartphone 100 with respect to the gravity direction and the attitude (inclination) of the smartphone 100 with respect to each axis of yaw, roll, and pitch. On the basis of the attitude detected by the attitude detection unit 113, whether the smartphone 100 is held laterally, held vertically, faced upward, faced downward, becomes diagonally or the like can be determined. As the attitude detection unit 113, any one of a plurality of sensors such as an acceleration sensor, a gyro sensor, a geomagnetic sensor, an azimuth sensor, and an altitude sensor can be used. As the attitude detection unit 113, a combination of two or more of the plurality of sensors can be also used.

As described above, the operation member 106 includes the touch panel 106a. The touch panel 106a is an input device configured planarly by being overlapped with the display 105 so that coordinate information corresponding to a contacted position is output. The CPU 101 can detect the following operations or states of the touch panel 106a.

A finger or a pen that has not touched the touch panel 106a newly touches the touch panel 106a, that is, start of a touch (hereinafter, referred to as touch-down (Touch-Down))

A state where a finger or a pen is in touch with the touch panel 106a (hereinafter referred to as touch-on (Touch-On))

A finger or a pen is moving while in touch with the touch panel 106a (hereinafter referred to as touch-move (Touch-Move))

A finger or a pen having touched the touch panel 106a leaves the touch panel 106a (released), that is, end of the touch (hereinafter, referred to as touch-up (Touch-Up))

A state where nothing touches the touch panel 106a (hereinafter, referred to as touch-off (Touch-Off))

When the touch-down is detected, the touch-on is also detected at the same time. After the touch-down, the touch-on is continuously detected usually unless the touch-up is detected. When the touch-move is detected, too, the touch-on is detected at the same time. Even when the touch-on has been detected, if the touch position has not been moved, the touch-move is not detected. When the touch-up of all the fingers or pens having been in touch was detected, the touch-off is detected.

These operations/states and position coordinates where the finger or the pen is in touch on the touch panel 106a are notified to the CPU 101 via the internal bus 150. The CPU 101 determines what operation (touch operation) was performed on the touch panel 106a on the basis of the notified information. Regarding the touch-move, moving directions of the finger or the pen moving on the touch panel 106a can be also determined for each of perpendicular component/horizontal component on the touch panel 106a on the basis of a change in the position coordinates. When the touch-move for a predetermined distance or more is detected, performance of a slide operation is assumed to be determined. Such an operation that the finger is quickly moved only for some distance while in touch on the touch panel 106a and then released is called a flick. The flick operation is, in other words, an operation of tracing on the touch panel 106a quickly like flicking with a finger. When the touch-move for a predetermined distance or more at a predetermined speed or more was detected, and the touch-up was detected after that, it can be determined that a flick was performed (it can be determined that the flick was performed subsequently to the slide operation). Moreover, such a touch operation that a plurality of spots (two points, for example) are touched together (multi-touched) so as to bring the touch positions closer to each other is called pinch-in, while such a touch operation to separate the touch positions away from each other as pinch-out. The pinch-out and the pinch-in are collectively called a pinch operation (or simply as a pinch). As the touch panel 106a, a touch panel of any method in touch panels of various methods such as a resistive method, a capacitive method, a surface elastic wave method, an infrared method, an electromagnetic induction method, an image recognition method, and an optical sensor method may be used. There are a method of detection that touch was made when there was a contact with the touch panel and a method of detection that touch was made when a finger or a pen approaches the touch panel, but any method may be used.

Each of the following embodiments relates to switching control of an angle of view when the still-image pickup and the moving-image pickup are performed in parallel by the smartphone 100.

First Embodiment

In a first embodiment, the out-camera 114 includes three lenses with angles of view different from one another, that is, the telephoto lens 114a, the standard lens 114b, and the wide-angle lens 114c. The out-camera 114 can pick up images in the plurality of image-pickup modes in parallel by using the telephoto lens 114a, the standard lens 114b, and the wide-angle lens 114c. For example, the out-camera 114 picks up images in the moving-image mode by using the standard lens 114b and picks up images in the still-image mode by using the telephoto lens 114a.

The out-camera 114 picks up images while switching the lens used in the moving-image mode and the still-image mode, respectively, on the basis of the user's operation. The moving-image mode and the still-image mode share the three lenses (image pickup units), and images are picked up by using the lenses different from each other, when images are picked up in parallel in each of the image-pickup modes.

Figure 3A:
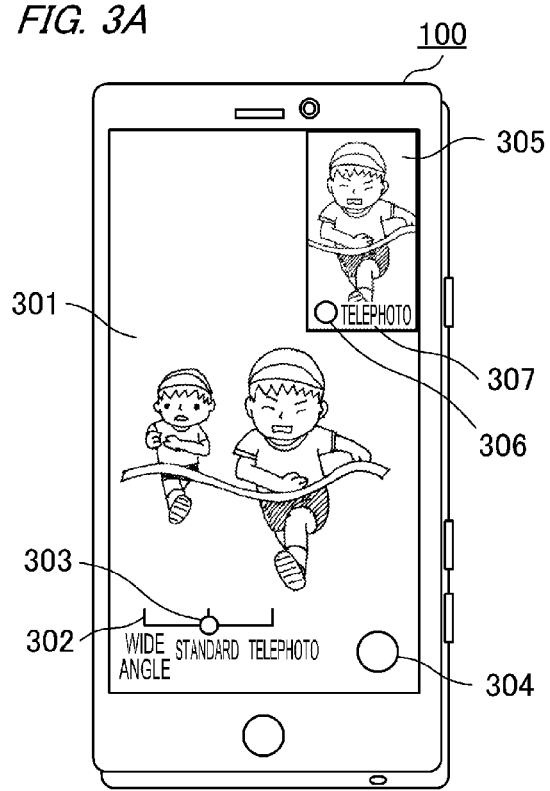
FIGS. 3A to 3C are diagrams for explaining a view-angle switching operation.
Figure 3B:
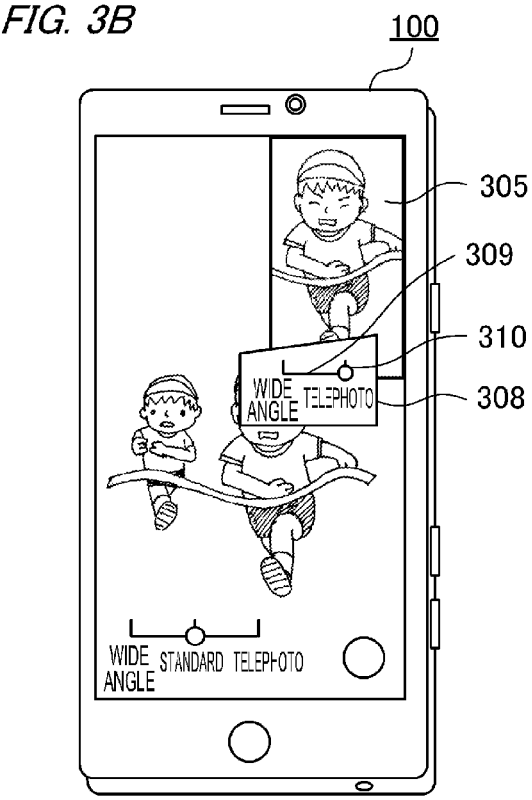
Figure 3C:
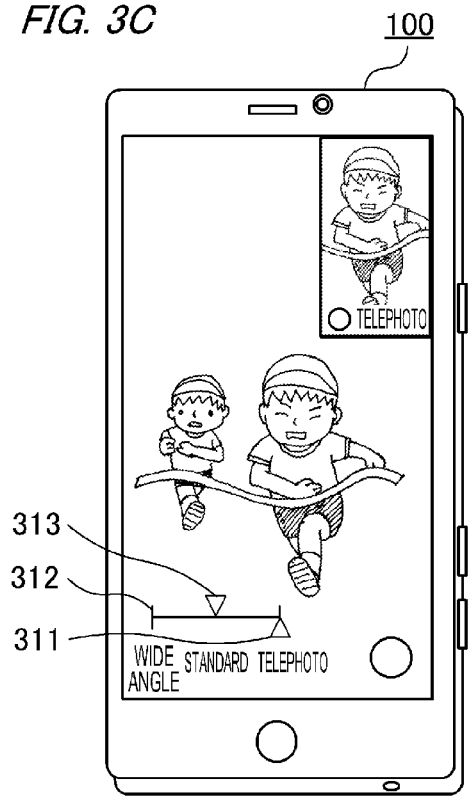
Figure 4:
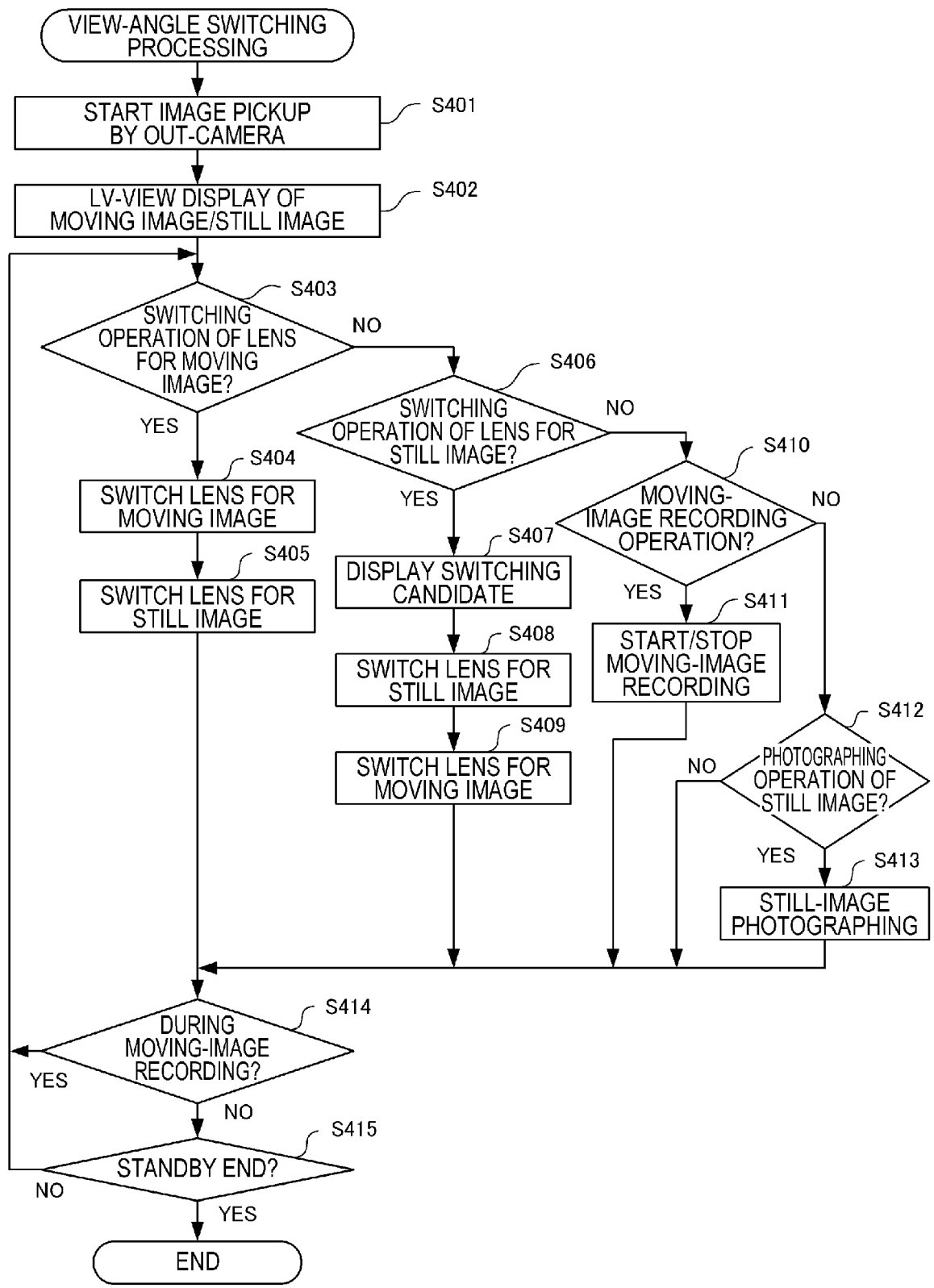
FIG. 4 is a flowchart exemplifying view-angle switching processing according to a first embodiment.

By referring to FIGS. 3A to 3C and FIG. 4, view-angle switching processing of picked-up images in the moving-image mode and the still-image mode will be explained. FIGS. 3A to 3C are diagrams for explaining the view-angle switching operation by the user. FIG. 4 is a flowchart exemplifying the view-angle switching processing by the out-camera 114 and the out-camera image processing unit 104. The view-angle switching processing in FIG. 4 is realized by the CPU 101 of the smartphone 100 which develops a program recorded in the non-volatile memory 103 to the memory 102 and executes it.

The view-angle switching processing is started when a camera application is started in the smartphone 100, for example. The view-angle switching processing may be started not only by the camera application but by starting of means of picking up the still images and the moving images in parallel.

At S401, the CPU 101 starts image pickup by the out-camera 114 by using the three lenses, that is, the telephoto lens 114a, the standard lens 114b, and the wide-angle lens 114c. The image picked up by using each lens is subject to various types of image processing by the telephoto-image processing unit 104a, the standard-image processing unit 104b, and the wide-angle image processing unit 104c of the out-camera image-processing unit 104.

At S402, the CPU 101 LV-displays the picked-up images picked up in the moving-image mode and the still-image mode. The CPU 101 LV-displays the image picked up by using the standard lens 114b in the moving-image mode and the image picked up by using the telephoto lens 114a in the still-image mode on the display 105, for example.

FIG. 3A shows a screen example which LV-displays the image picked up by using the standard lens 114b in the moving-image mode and the image picked up by using the telephoto lens 114a in the still-image mode. The display 105 is divided into a main image area 301 which displays the image picked up in the moving-image mode by using the standard lens 114b and a sub image area 305 which displays the image picked up in the still-image mode by using the telephoto lens 114a. In FIG. 3A, the main image area 301 is an area displayed substantially on the whole of the display 105, while the sub image area 305 is an area displayed superimposed at upper right of the main image area 301.

On the main image area 301, an index 302, an indicator 303, and a moving-image recording button 304 are displayed by being superimposed on the LV image in the moving-image mode. The index 302 indicates a lens which can be switched in the moving-image mode. The indicator 303 indicates the lens in use in the moving-image mode in the index 302. The example in FIG. 3A indicates that the standard lens 114b is being used in the moving-image mode. Moreover, the indicator 303 is an operation member (item) for switching the lens to be used. The user can switch the lens to be used by touching the indicator 303 and moving it on the index 302 by touch-move. The item constituted by the index 302 and the indicator 303 is an example of a first item. The moving-image recording button 304 is an operation member (item) for instructing recording start and recording stop of the moving image.

On the sub image area 305, a still-image photographing button 306 and a lens switching member 307 are displayed by being superimposed on the LV image in the still-image mode. The still-image photographing button 306 is an operation member (item) for photographing a still image. The still-image photographing button 306 can be moved on the picked-up image in the still-image mode and on the picked-up image in the moving-image mode by the touch-move. That is, the still-image photographing button 306 can move from the sub image area 305 to the main image area 301.

The user can photograph a still image of the picked-up image which is LV-displayed on the main image area 301 by moving the still-image photographing button 306 to the main image area 301 and touching it. When a center of the still-image photographing button 306 is on the picked-up image in the still-image mode of the sub image area 305, the CPU 101 photographs the still image by the lens used in the still-image mode. When the center of the still-image photographing button 306 is on the picked-up image in the moving-image mode of the main image area 301, the CPU 101 photographs the still image by the lens used in the moving-image mode. The still-image photographing button 306 is an example of a fourth item.

The lens switching member 307 indicates the lens used in the picked-up image in the still-image mode displayed on the sub image area 305. The lens switching member 307 is, as will be explained at S407, an operation member (item) for changing the lens used in the still image mode.

At S403, the CPU 101 determines whether there has been an operation of switching the lens for the moving image used in the moving-image mode. The CPU 101 determines whether a position of the indicator 303 has been changed on the basis of information of the operation detected by the touch panel 106a. If the indicator 303 at completion of the touch-move selects the lens different from the lens in use, the CPU 101 determines that the operation of switching the lens for the moving image has been performed. Moreover, if the indicator 303 at the completion of the touch-move selects the same lens as the lens in use, the CPU 101 determines that there has not been an operation of switching the lens for the moving image. If the operation of switching the lens for the moving image has been performed, the processing proceeds to S404, while if the operation of switching the lens for the moving image has not been performed, the processing proceeds to S406.

At S404, the CPU 101 switches the lens for the moving image from the lens in the current use to a lens selected by the user at S403. When the lens for the moving image is switched, the CPU 101 causes the image picked up by the lens for the moving image after the switching to be LV-displayed on the main image area 301.

When the lens for the moving image is switched from the standard lens 114b in the current use to the telephoto lens 114a used in the still-image mode, for example, the CPU 101 temporarily stops the picked-up image which is LV-displayed on the sub image area 305 in the still-image mode. After the LV-display of the still-image mode is temporarily stopped, the CPU 101 switches the lens for the moving image to the telephoto lens 114a.

At S405, the CPU 101 executes the switching processing of the lens for the still image. When the lens for the moving image is to be switched to the lens in use as the lens for the still image, the CPU 101 switches the lens for the still image to a lens not in use either in the moving-image mode or the still-image mode. For example, the CPU 101 switches the lens for the still image to the wide-angle lens 114c different from both the standard lens 114b used in the moving-image mode and the telephoto lens 114a used in the still-image mode. The CPU 101 causes the picked-up image in the still-image mode by the lens after the switching to be LV-displayed on the sub image area 305.

At S404, when the lens for the moving image is to be switched to a lens not in use as the lens for the still image, at S405, the CPU 101 does not change the lens for the still image or does not change the LV-display on the sub image area 305, either.

In the explanation above, the lens for the moving image is switched at S404 and then, the lens for the still image is switched at S405. However, when the lens for the moving image is to be switched to the lens in use as the lens for the still image, the picked-up image LV-displayed on the sub image area 305 in the still-image mode needs to be temporarily stopped. Therefore, when the lens in use in the still-image mode is to be switched, the processing of switching the lens for the moving image at S404 may be executed after the switching of the lens for the still image at S405. In this case, without temporarily stopping the picked-up image which is LV-displayed on the sub image area 305 in the still-image mode, the lens in each of the still-image mode and the moving-image mode can be switched.

At S406, the CPU 101 determines whether the operation of switching the lens for the still image has been performed. The CPU 101 determines whether the lens switching member 307 has been touched on the basis of the information of the operation detected by the touch panel 106a. If the lens switching member 307 has been touched, the CPU 101 determines that the operation of switching the lens for the still image has been performed. Moreover, if the lens switching member 307 has not been touched, the CPU 101 determines that the operation of switching the lens for the still image has not been performed. If the operation of switching the lens for the still image has been performed, the processing proceeds to S407, while if the operation of switching the lens for the still image has not been performed, the processing proceeds to S410.

At S407, the CPU 101 displays candidates for the lens which can be switched as the lens for the still image. The CPU 101 controls the display of the candidates so that the switching to the currently used lens can be also accepted. FIG. 3B shows a screen example when the operation of switching the lens for the still image was accepted during recording of the moving image displayed on the main image area 301.

When the lens switching member 307 is touched on the screen of FIG. 3A, the CPU 101 superimposes and displays a popup window 308 including an index 309 and an indicator 310 in the sub image area 305 as shown in FIG. 3B. The index 309 indicates the lens which can be switched in the still-image mode. The indicator 310 indicates the lens in use in the still-image mode in the index 309. The example in FIG. 3B shows that the standard lens 114b is used in the moving-image mode, and the telephoto lens 114a is used in the still-image mode. Moreover, the indicator 310 is the operation member (item) for switching the lens to be used by the touch-move by the user on the index 309. The item constituted by the index 309 and the indicator 310 is an example of a second item.

The sub image area 305 is displayed larger, as shown in FIG. 3B, than that when the popup window 308 is not displayed, while the popup window 308 is displayed for switching of the lens. As a result, the user can easily check the LV-image of the still image when the lens is to be switched.

During the recording of the moving image displayed on the main image area 301, the CPU 101 executes control so that the lens in use in the moving-image mode is not selected in the still-image mode so as not to interrupt the moving-image recording. In the example in FIG. 3B, the standard lens 114b in use in the moving-image mode is not displayed on the index 309. That is, the CPU 101 controls so that the switching to the lens in use in the moving-image mode is not accepted and controls so that the lens used in the moving-image mode is not switched during the recording of the moving image. On the other hand, in the case not during the recording of the moving image, the CPU 101 enables selection of the lens in use in the moving-image mode and displays also the lens in use in the moving-image mode on the index 309.

At S408, the CPU 101 switches the lens for the still image to the lens selected by the user at S407. When the lens for the still image is switched, the CPU 101 LV-displays the image picked up by the lens for the still image on the sub image area 305 after the switching.

When the lens for the still image is switched from the currently used telephoto lens 114a to the standard lens 114b used in the moving-image mode, the CPU 101 temporarily stops the picked-up image which is LV-displayed on the main image area 301 in the moving-image mode. After the temporary stop of the LV-display in the moving-image mode, the CPU 101 switches the lens for the still image to the standard lens 114b.

At S409, the CPU 101 executes the switching processing of the lens for the moving image. When the lens for the still image is to be switched to the lens in use as the moving image, the CPU 101 switches the lens for the moving image to the lens not in use in the moving-image mode or the still-image mode. For example, the CPU 101 switches the lens for the moving image to the wide-angle lens 114c different from the telephoto lens 114a used in the still-image mode and the standard lens 114b used in the moving-image mode. The CPU 101 LV-displays the picked-up image in the moving-image mode by the lens after the switching on the main image area 301.

At S408, when the lens for the still image is to be switched to the lens not used as the lens for the moving image, at S409, the CPU 101 does not change the lens for the moving image or change the LV-display on the main image area 301. Moreover, in the case of during the recording of the moving image, the lens for the still image will not be switched to the lens used as the lens for the moving image and thus, the CPU 101 does not change the lens for the moving image or the LV-display on the main image area 301.

Moreover, in the aforementioned explanation, after the lens in the still-image mode was switched at S408, the lens in the moving-image mode was switched at S409. However, when the lens in use in the still-image mode is switched to the lens in the moving-image mode, the LV-display in the moving-image mode needs to be temporarily stopped. Thus, when the lens in the still-image mode is to be switched to the lens in use in the moving-image mode, the processing of switching the lens for the still image at S407 may be executed after the processing of switching the lens for the moving image at S409 is executed. In this case, the lens switching can be executed without temporarily stopping the LV-display of the moving-image mode.

At S410, the CPU 101 determines whether a moving-image recording operation was performed. The moving-image recording operation is an operation of starting or stopping the moving-image recording. The CPU 101 determines whether the moving-image recording button 304 was touched on the basis of the information of the operation detected on the touch panel 106a. When the moving-image recording button 304 was touched, the CPU 101 determines that the moving-image recording operation was performed. Moreover, when the moving-image recording button 304 was not touched, the CPU 101 determines that the moving-image recording operation was not performed. When the moving-image recording operation was performed, the processing proceeds to S411, while when the moving-image recording operation was not performed, the processing proceeds to S412.

At S411, the CPU 101 starts or stops the recording of the moving image. If the moving image is not being recorded, the CPU 101 starts recording of the moving image picked up by the lens for the moving image and displayed on the main image area 301. Moreover, if the moving image is being recorded, the CPU 101 stops the moving-image recording.

In the case where the standard lens 114b is used as the lens for the moving image, when the moving-image recording is started, the CPU 101 executes image processing and encoding processing of a video signal output from the standard lens 114b by the standard-image processing unit 104b. The CPU 101 stores image contents processed by the standard-image processing unit 104b in the memory 102. The CPU 101 generates a moving-image file from the image contents stored in the memory 102 and records it in the non-volatile memory 103 or the storage medium 108 via the storage medium I/F 107.

when the moving-image recording is stopped, the CPU 101 stops the encoding processing by the standard-image processing unit 104b and stops the processing of generating the moving-image file from the video contents stored in the memory 102 and recording it in the non-volatile memory 103 or the storage medium 108.

At S412, the CPU 101 determines whether a still-image photographing operation was performed. The CPU 101 determines whether the still-image photographing button 306 was touched on the basis of the information of the operation detected by the touch panel 106a. If the still-image photographing button 306 was touched, the CPU 101 determines that the still-image photographing operation was performed. Moreover, if the still-image photographing button 306 was not touched, the CPU 101 determines that the still-image photographing operation was not performed. When the still-image photographing operation was performed, the processing proceeds to S413, while when the still-image photographing operation was not performed, the processing proceeds to S414.

At S413, the CPU 101 photographs a still image and records the generated still-image file in the non-volatile memory 103 or the storage medium 108. When the still-image photographing button 306 is on the sub image area 305, the CPU 101 generates a still-image file from the picked-up image by the lens for the still image, while when the still-image photographing button 306 is on the main image area 301, the CPU 101 generates a still-image file from the picked-up image by the lens for the moving image.

For example, when the telephoto lens 114a is used as the lens for the still image, and the still-image photographing button 306 is on the sub image area 305, the telephoto-image processing unit 104a executes the image processing and the encoding processing of the video signal output from the telephoto lens 114a and generates a still-image file. Moreover, when the standard lens 114b is used as the lens for the moving image, and the still-image photographing button 306 is on the main image area 301, the standard-image processing unit 104b executes the image processing and the encoding processing of the video signal output from the standard lens 114b and generates a still-image file.

The CPU 101 stores the image contents processed at each unit of the out-camera image processing unit 104 in the memory 102. The CPU 101 generates a still-image file from the image contents stored in the memory 102 and records it in the non-volatile memory 103 or the storage medium 108 via the storage medium I/F.

At S414, the CPU 101 determines whether the moving image is being recorded. If the moving image is being recorded, the processing returns to S403, while if the moving image is not being recorded, the processing proceeds to S415. When any one of the parts of the out-camera image processing unit 104 is executing the encoding processing of the moving image, the CPU 101 determines that the moving image is being recorded, while when the encoding processing is not being executed, the CPU 101 can determine that the moving image is not being recorded.

At S415, the CPU 101 determines whether a photographing standby state has been finished. The photographing standby state is a state where the LV-image in the moving-image mode and the LV-image in the still-image mode are displayed on the display, and recording start of a moving image or photographing of a still image is waited for. When the photographing standby state is finished, the view-angle switching processing shown in FIG. 4 is finished, while when the photographing standby state is not finished, the processing returns to S403. When the user finishes the camera application, for example, the CPU 101 can determine that the photographing standby state is finished.

The index 302 and the indicator 303 on the main image area 301 explained at S403 and the index 309 and the indicator 310 on the sub image area 305 explained at S407 may be realized by using a common index. In the example shown in FIG. 3C, the index 312, the indicator 313 for the moving image, and the indicator 311 for the still image are superimposed on the LV-image in the moving-image mode in the main image area 301 and displayed. The item constituted by the index 312, the indicator 313, and the indicator 311 is an example of a third item. The user can switch the lens to be used in the moving-image mode and the still-image mode, respectively, by the third item.

The index 312 indicates a lens which can be switched in the moving-image mode on an upper side (center side of the main image area 301) and a lens which can be switched in the still-image mode on a lower side (periphery side of the main image area 301). In the example in FIG. 3C, since the moving image is being recorded by using the standard lens 114b, a scale for selecting the standard lens 114b is not displayed on the lower side of the index 312. If the moving image is not being recorded, a scale for selecting the standard lens 114b is displayed, and the user can select the standard lens 114b.

The indicator 313 is displayed on the upper side of the index 312, and similarly to the indicator 303 in FIG. 3A, it indicates the lens in use in the moving-image mode. The example in FIG. 3C indicates that the standard lens 114b is being used in the moving-image mode. Moreover, the indicator 313 is the operation member (item) for switching the lens to be used in the moving-image mode. The user can switch the lens to be used in the moving-image mode by touching (single-touch) the indicator 313 at one spot and moving it by touch-move on the index 312.

When the indicator 313 is touched and another spot is also touched (multi-touch at two spots or more), as shown in FIG. 3C, the indicator 311 indicating the lens in use in the still-image mode is displayed on the lower side of the index 312. The example in FIG. 3C indicates that the telephoto lens 114a is in use in the still-image mode. Moreover, indicator 311 is the operation member (item) for switching the lens to be used in the still-image mode. The user can switch the lens to be used in the still-image mode by moving the indicator 311 by touch-move on the index 312 in a state of the multi-touch on the indicator 311.

The indicator 311 and the scale of the lens for the still image of the index 312 may be displayed while the multi-touch is detected with respect to the indicator 313 or the index 312 or may be displayed all the time.

In the first embodiment described above, when the lens for the moving image is to be switched to the lens in use in the still-image mode, the CPU 101 switches the lens for the still image to the lens not in use in the moving-image mode or the still-image mode. On the contrary, when the lens for the still image is to be switched to the lens in use in the moving-image mode, the CPU 101 switches the lens for the moving image to the lens not in use in the moving-image mode or the still-image mode. By controlling the switching of the angle of view as above, the user can seamlessly switch the angle of view from the wide angle to the telephoto without interrupting the image pickup. Moreover, in the case of image pickup in the moving-image mode and the still-image mode in parallel, a labor of switching the angle of view in each image-pickup mode can be reduced.

Second Embodiment

In the first embodiment, except the case where the moving image is being recorded in the moving-image mode, the user can switch the lens for the moving image to the lens in use in the still-image mode or can switch the lens for the still image to the lens in use in the moving-image mode. On the other hand, in the second embodiment, the lens in use in the image-pickup mode with priority in a plurality of the image-pickup modes (hereinafter referred to as a priority image-pickup mode) is controlled so as not to be used in the other image-pickup modes (hereinafter referred to as a non-priority image-pickup mode). The priority image-pickup mode can be set by the user.

In the second embodiment, detailed explanation of contents similar to those in the first embodiment will be omitted, and contents and processing different from those in the first embodiment will be explained in detail. FIG. 5 is a flowchart exemplifying the view-angle switching processing by the out-camera 114 and the out-camera image processing unit 104. The view-angle processing in FIG. 5 is realized by the CPU 101 of the smartphone 100 which develops the program recorded in the non-volatile memory 103 to the memory 102 and executes it.

The processing at S501 and S502 is similar to S401 and S402 and thus, explanation will be omitted. At S503, the CPU 101 sets the image-pickup mode selected by the user operation to the priority image-pickup mode. The priority image-pickup mode is not limited to a case set by the user but may be set to the moving-image mode as initial setting, for example. The picked-up image in the priority image-pickup mode is LV-displayed on the main image area 301, and the picked-up image in the non-priority image-pickup mode is LV-displayed on the sub image area 305.

An operation of setting the priority image-pickup mode is an operation of the touch-move on the main image area 301 and releasing the finger while keeping in touch with the picked-up image in the still-image mode of a setting target on the sub image area 305, for example. When the picked-up image in the still-image mode displayed on the sub image area 305 is touch-moved to the main image area 301, for example, the CPU 101 sets the still-image mode to the priority image-pickup mode and LV-displays the picked-up image in the still-image mode on the main image area 301.

Moreover, the operation of setting the priority image-pickup mode may be an operation of changing a direction of the display 105 of the smartphone 100. The direction of the display 105 can be discriminated on the basis of an attitude of the smartphone 100 detected by the attitude detection unit 113. When the direction of the display 105 becomes vertical, for example, the CPU 101 sets the moving-image mode to the priority image-pickup mode, while when it becomes lateral, the CPU 101 sets the still-image mode to the priority image-pickup mode.

When the priority image-pickup mode is changed, the CPU 101 LV-displays the picked-up image in the priority image-pickup mode on the main image area 301 and displays the picked-up image in the non-priority image-pickup mode on the sub image area 305. Moreover, when the priority image-pickup mode was changed, the CPU 101 may use the lens having been used in the priority image-pickup mode before the priority image-pickup mode is changed even after the change. In this case, the CPU 101 switches the lens to be used in the non-priority image-pickup mode after the change to the lens not in use in the priority image-pickup mode after the change.

In the following processing, explanation will be made by assuming that the priority image-pickup mode is the moving-image mode, and the non-priority image-pickup mode is the still-image mode. The processing from S504 to S507 is similar to the processing from S403 to S406 in FIG. 4.

At S504, the CPU 101 determines whether an operation of switching the lens used in the moving-image mode set to the priority image-pickup mode (priority lens) was performed. If the operation of switching the priority lens was performed, at S505, the CPU 101 switches the priority lens (for the moving-image) to the lens selected by the user at S504. When an operation of switching the lens in use as the non-priority lens (for the still image) as the priority lens (for the moving image) was performed at S504, the CPU 101 executes the switching processing of the non-priority lens (for the still image) at S506. If the lens selected as the priority lens (for the moving image) at S504 is not the lens in use as the non-priority lens (for the still image), the processing at S506 is not executed. That is, the non-priority lens (for the still image) is not switched but maintained. Regarding the processing at S505 and S506, S506 may be executed first and then, S505 may be executed. At S507, the CPU 101 determines whether the operation of switching the non-priority lens (for the still image) has been performed.

At S508, the CPU 101 displays candidates for lenses which can be switched as a non-priority lens (for the still image). In the first embodiment, in the case of the moving-image recording in the moving-image mode, the CPU 101 does not display the standard lens 114*b* in use in the moving-image mode as a candidate for the lens for the still image. On the other hand, in the second embodiment, the CPU 101 does not display the standard lens 114*b* in use in the moving-image mode with priority as a candidate for the non-priority lens for the still image regardless of whether the moving-image is being recorded. Moreover, if the priority image-pickup mode is the still-image mode, the lens in use in the still-image mode with priority is not displayed as the candidate for the non-priority lens for the moving image. In either mode, control is executed so that the switching to the currently used lens can be accepted.

The processing at S509 is similar to the processing at S408 in FIG. 4. At S509, the CPU 101 switches the non-priority lens for the still image to the lens selected by the user at S508. The lens in use in the moving-image mode, which is a priority image-pickup mode, is not displayed as a candidate for the non-priority lens (for the still image) at S508 and thus, after the processing at S509, the processing of switching the priority lens (for the moving image) is not executed as in the first embodiment.

The processing at S510 to S515 is similar to the processing at S410 to S415 in FIG. 4. At S510, the CPU 101 determines whether the moving-image recording operation was performed. At S511, the CPU 101 starts or stops the recording of the moving image. At S512 and S513, the CPU 101 determines whether the still-image photographing operation was performed, and if the still-image photographing operation was performed, the still image is photographed.

At S514, the CPU 101 determines whether the moving image is being recorded. If the moving image is being recorded, the processing returns to S503, while if the moving image is not being recorded, the processing proceeds to S515. At S515, the CPU 101 determines whether the photographing standby state has been finished. If the photographing standby state has been finished, the view-angle switching processing shown in FIG. 5 is finished, while if the photographing standby state has not been finished, the processing returns to S503.

In the second embodiment described above, the switching of the non-priority lens to the lens in use in the priority image-pickup mode is limited. On the other hand, the switching of the priority lens to the lens in use in the non-priority image-pickup mode is not limited. When the priority lens is to be switched to the lens in use in the non-priority image-pickup mode, the CPU 101 switches the non-priority lens to the lens not in use in the priority image-pickup mode or the non-priority image-pickup mode. By switching the angle of view through the lens not in use as described above, the user can seamlessly switch the angle of view from the wide angle to the telephoto without interrupting the image pickup processing executed in parallel. Moreover, when the image is being picked up in the moving-image mode and the still-image mode in parallel, a labor for the user to switch the angle of view in the priority image-pickup mode can be reduced.

The explanation has been made with the example in which the picked-up image in the priority image-pickup mode is LV-displayed on the main image area 301, but the CPU 101 may use the image-pickup mode on the sub image area 305 as the priority image-pickup mode without changing the area for the LV-display even if the priority image-pickup mode is changed. In this case, the CPU 101 controls so that the lens to be used in the non-priority image-pickup mode on the main image area 301 is not changed to the lens in use in the priority image-pickup mode on the sub image area 305. Moreover, the change of the priority image-pickup mode can be realized by displaying the item indicating the priority image-pickup mode on either of the main image area 301 and the sub image area 305 and by moving the item by the user by the touch-move between the areas, for example.

Third Embodiment

In a third embodiment, the user can perform the still-image photographing by switching the LV-display for the moving image to the LV-display for the still-image photographing while the recording of the moving image is continued. The out-camera 114 includes the three lenses, that is, the telephoto lens 114a, the standard lens 114b, and the wide-angle lens 114c with angles of view different from one another. The out-camera 114 can pick up images in a plurality of the image-pickup modes in parallel by using the three lenses. In the third embodiment, the display 105 is not divided into areas as in the first embodiment and the second embodiment, but the LV-display in the still-image mode and the LV-display in the moving-image mode can be switched in accordance with the user's operation, instead of the division of the areas as in the first and second embodiment.

Figure 6A:
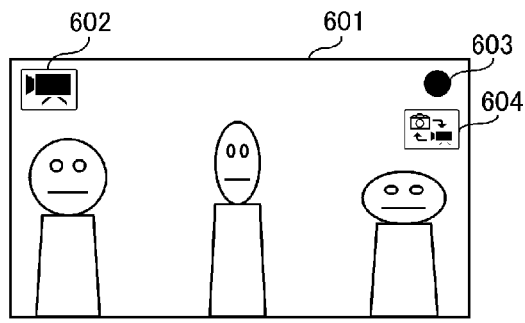
FIGS. 6A to 6E are diagrams for explaining LV-display switching processing according to a third embodiment.

FIGS. 6A to 6E are diagrams for explaining the switching processing of the LV-display in the third embodiment. An LV-display screen 601 in FIG. 6A is a screen in which a picked-up image picked up in the moving-image mode by using the standard lens 114b is LV-displayed on the display 105.

An icon 602 is an icon indicating a display state and indicates that the LV-display screen 601 LV-displays the picked-up image in the moving-image mode. The display state is a state where the picked-up image in the moving-image mode is LV-displayed on the display 105 or a state where the picked-up image in the still-image mode is LV-displayed. An icon 603 is an icon indicating a moving-image recording state and indicates that a recording-start operation of the moving image is on standby. An LV-display switching button 604 is the operation member (item) for the switching operation of switching between the LV-display in the moving-image mode and the LV-display in the still-image mode. The LV-display switching button 604 is an example of a fifth item.

Figure 6B:
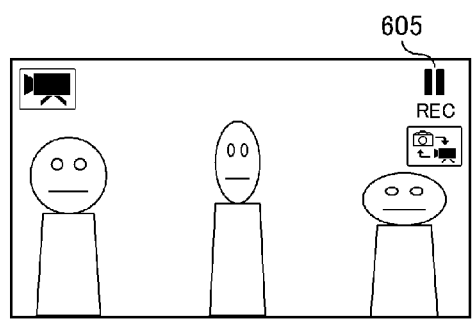

An icon 605 in FIG. 6B is an icon indicating the moving-image recording state and indicates that an LV-image in the moving-image mode displayed on the display 105 is being recorded. Start and stop of the moving-image recording is executed by an item (not shown) similar to the moving-image recording button 304 explained in FIG. 3A, for example.

Figure 6C:
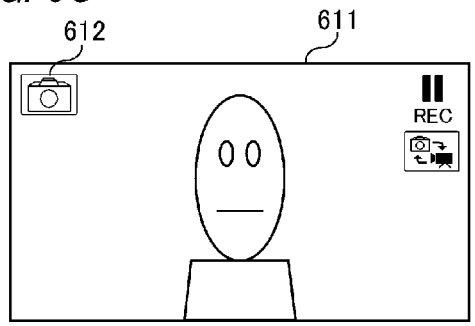

An LV-display screen 611 in FIG. 6C is a screen in which a picked-up image picked up in the still-image mode by using the telephoto lens 114a is LV-displayed on the display 105. An icon 612 is an icon indicating the display state and indicates that the LV-display screen 611 LV-displays the picked-up image in the still-image mode.

Figure 6D:
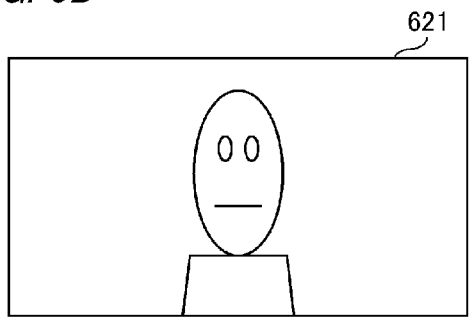
Figure 6E:
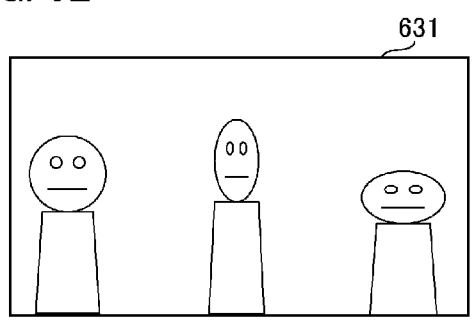

An image 621 in FIG. 6D is a still image generated by a still-image photographing operation from an image on the LV-display screen 611 in FIG. 6C picked up in the still-image mode by using the telephoto lens 114a. An image 631 in FIG. 6E is a still image with the same angle of view as a moving image generated by cutting out one frame from a moving image picked up in the moving-image mode by using the standard lens 114b.

FIG. 7 is a flowchart exemplifying the LV-display switching processing according to the third embodiment. The LV-display switching processing in FIG. 7 is realized by the CPU 101 of the smartphone 100 which develops the program recorded in the non-volatile memory 103 to the memory 102 and executes it.

At S701, the CPU 101 accepts the user operation. If the accepted user operation is the switching operation of the LV-display, the processing proceeds to S702. As the switching operation of the LV-display, an operation of touching the LV-display switching button 604 displayed on the display 105 is assumed, but this is not limiting. The switching operation of the LV-display may be the operation of double-tap or the touch-move on the LV-image displayed on the display 105 or may be pressing-down on a physical button. The user can cause a picked-up image in the still-image mode on an area including a subject or a desired position to be LV-displayed by double-tapping the subject or by surrounding the area (position) to be photographed by the touch-move on the LV image, for example.

At S702, the CPU 101 determines the display state of the display 105. The display state is a state where the picked-up image in the moving-image mode is LV-displayed or the picked-up image in the still-image mode is LV-displayed on the display 105. If the picked-up image in the moving-image mode is LV-displayed, the processing proceeds to S703, while if the picked-up image in the still-image mode is LV-displayed, the processing proceeds to S707.

At S703, the CPU 101 determines which of the telephoto lens 114a, the standard lens 114b, and the wide-angle lens 114c is the lens in use for the LV-display in the moving-image mode. When the lens in use in the moving-image mode is the wide-angle lens 114c or telephoto lens 114a, the processing proceeds to S704. When the lens in use in the moving-image mode is the standard lens 114b, the processing proceeds to S705.

At S704, the CPU 101 starts image pickup in the still-image mode by using the standard lens 114b. The CPU 101 can then, LV-display the picked-up image picked up in the still-image mode by using the standard lens 114b on the display 105 or photograph it as a still image.

At S705, the CPU 101 starts image pickup in the still-image mode by using the telephoto lens 114a. The CPU 101 can then, LV-display the picked-up image picked up in the still-image mode by using the telephoto lens 114a on the display 105 or photograph it as a still image.

S703 to S705 show examples in which the lens for the still image is determined on the basis of whether the lens in use in the moving-image mode is the wide-angle lens 114c, the telephoto lens 114a or the standard lens 114b, but they are not limiting. The lens for the still image only needs to be determined to be a lens different from the lens used in the moving-image mode. For example, the lens used in the still-image mode may be determined so as to be a lens closer to the telephoto side than the lens used in the moving-image mode.

At S706, the CPU 101 changes the display of the display 105 from the LV-display in the moving-image mode to the LV-display in the still-image mode. When the moving image is being recorded in the moving-image mode, the CPU 101 LV-displays the picked-up image in the still-image mode while the recording of the moving image is continued. The CPU 101 changes the icon indicating the display state of the display 105 to the icon 612 indicating the LV-display in the still-image mode and returns to S701.

At S707, the CPU 101 determines which of the telephoto lens 114a, the standard lens 114b and the wide-angle lens 114c is the lens in use for the LV-display in the still-image mode. When the lens in use in the still-image mode is the wide-angle lens 114c, the processing proceeds to S708. When the lens in use in the still-image mode is the telephoto lens 114a or the standard lens 114b, the processing proceeds to S709.

At S708, the CPU 101 starts image pickup in the moving-image mode by using the standard lens 114b. The CPU 101 can then, LV-display the picked-up image picked up in the moving-image mode by using the standard lens 114b on the display 105 or record it as the moving image.

At S709, the CPU 101 starts image pickup in the moving-image mode by using the wide-angle lens 114c. The CPU 101 can then, LV-display the picked-up image picked up in the moving-image mode by using the wide-angle lens 114c on the display 105 or record it as the moving image.

S707 to S709 show examples in which the lens for the moving image is determined on the basis of whether the lens in use in the still-image mode is the wide-angle lens 114c, the telephoto lens 114a or the standard lens 114b, but they are not limiting. The lens for the moving image only needs to be determined to be a lens different from the lens used in the still-image mode. For example, the lens used in the moving-image mode may be determined so as to be a lens closer to the wide-angle side than the lens used in the still-image mode.

At S710, the CPU 101 changes the display of the display 105 from the LV-display in the still-image mode to the LV-display in the moving-image mode. The CPU 101 changes the icon indicating the display state of the display 105 to the icon 602 indicating the LV-display in the moving-image mode and returns to S701.

If the user operation accepted at S701 is the operation of still-image photographing, the processing proceeds to S711. At S711, the CPU 101 determines the display state of the display 105. If the picked-up image in the moving-image mode is LV-displayed on the display 105, the processing proceeds to S712. If the picked-up image in the still-image mode is LV-displayed on the display 105, the processing proceeds to S713.

At S712, the CPU 101 photographs a still image by the lens in use in the moving-image mode. The CPU 101 cuts out one frame from the moving image picked up by the lens in use in the moving-image mode, generates a still image with the same angle of view as that of the moving image as the image 631 shown in FIG. 6E and returns to S701.

At S713, the CPU 101 photographs a still image by the lens in use in the still-image mode. Since the lens in use in the still-image mode is different from the lens used in the moving-image mode, the CPU 101 generates a still image with an angle of view different from that of the moving image as the image 621 shown in FIG. 6D and returns to S701.

If the user operation accepted at S701 is the operation of start/stop the moving-image recording, the processing proceeds to S714. At S714, the CPU 101 determines the recorded state of the moving image. In the case of standby, the processing proceeds to S715, while in the case of recording, the processing proceeds to S721.

At S715, the CPU 101 determines the display state of the display 105. If the picked-up image in the moving-image mode is LV-displayed on the display 105, the processing proceeds to S716. If the picked-up image in the still-image mode is LV-displayed on the display 105, the processing proceeds to S717.

At S716, the CPU 101 starts the moving-image recording by the lens in use in the moving-image mode. The CPU 101 changes the icon indicating the moving-image recording state to the icon 605 indicating recording and returns to S701.

At S717, the CPU 101 determines which of the telephoto lens 114a, the standard lens 114b, and the wide-angle lens 114c is the lens in use on the LV-display in the still-image mode. When the lens in use in the still-image mode is the wide-angle lens 114c, the processing proceeds to S718. When the lens in use in the still-image mode is the telephoto lens 114a or the standard lens 114b, the processing proceeds to S719.

At S718, the CPU 101 starts image pickup in the moving-image mode by using the standard lens 114b and proceeds to S720. At S719, the CPU 101 starts image-pickup in the moving-image mode by using the wide-angle lens 114c and proceeds to S720.

S717 to S719 show examples in which the lens for the moving image is determined on the basis of whether the lens in use in the still-image mode is the wide-angle lens 114c, the telephoto lens 114a or the standard lens 114b, but they are not limiting. The lens for the moving image only needs to be determined to be a lens different from the lens used in the still-image mode. For example, the lens used in the moving-image mode may be determined so as to be a lens closer to the wide-angle side than the lens used in the still-image mode.

At S720, the CPU 101 changes the display of the display 105 from the LV-display in the still-image mode to the LV-display in the moving-image mode and starts the moving-image recording. The CPU 101 changes the icon indicating the moving-image recording state to the icon 605 indicating that the moving image is being recorded and returns to S701.

If the moving image is being recorded at S714, the CPU 101 stops the moving-image recording at S721, changes the icon indicating the moving-image recording state to the icon 603 indicating the standby for the recording-start operation of the moving image and returns to S701.

If the user operation accepted at S701 is an operation of finishing the LV, the LV-display switching processing shown in FIG. 7 is finished.

Figure 8:
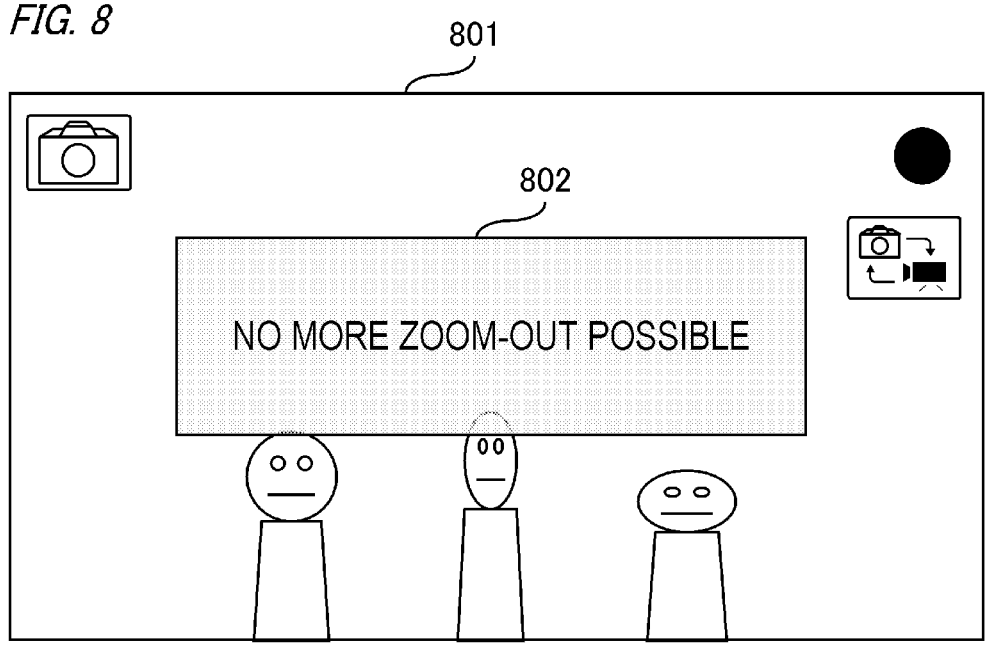
FIG. 8 is a diagram for explaining zoom-out processing in a still-image LV display.

FIG. 8 is a diagram for explaining zoom-out processing in the still-image LV-display. When the display of the display 105 is changed to the LV-display in the still-image mode during recording of the moving image by using the wide-angle lens 114c and performs zoom-out by the pinch-in operation, such a state is brought about that a wide-end of the standard lens 114b is zoomed-out the most. That is because the wide-angle lens 114c is in use in the moving-image mode, and the lens used in the still-image mode is not switched to the wide-angle lens 114c. On the LV-display screen 801 in FIG. 8, when the user performs the zoom-out by the pinch-in operation and reaches a wide end of the standard lens 114b, the CPU 101 displays a notification 802 that "No-more zoom-out possible" on the display 105.

On the contrary, during the recording of the moving image using the telephoto lens 114a, when the display of the display 105 is changed to the LV-display in the still-image mode, and the zoom-in is performed by the pinch-out operation, the tele-end of the standard lens 114b is brought into a state of zoomed-in the most. That is because the telephoto lens 114a is used in the moving-image mode, and the lens used in the still-image mode is not switched to the telephoto lens 114a. In this case, when the user performs the zoom-in by the pinch-out operation and reaches the tele-end of the standard lens 114b, the CPU 101 displays a notification that "No-more zoom-in possible" on the display 105.

Figure 9A:
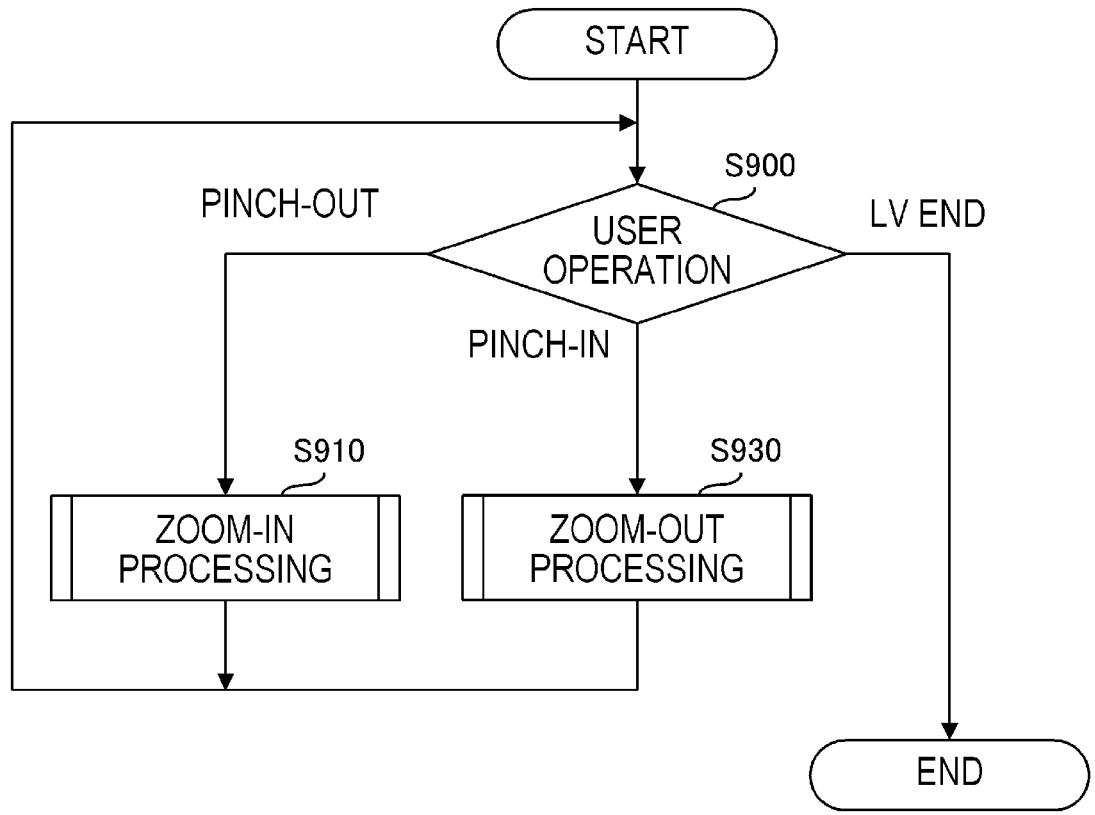
FIG. 9A is a flowchart exemplifying zoom-in/zoom-out processing.

By referring to FIGS. 9A to 9C, zoom-in/zoom-out processing on the still-image LV-display according to the third embodiment will be explained. FIG. 9A is a flowchart exemplifying the zoom-in/zoom-out processing. FIG. 9B is a flowchart exemplifying details of the zoom-in processing. FIG. 9C is a flowchart exemplifying details of the zoom-out processing. The zoom-in/zoom-out processing in FIGS. 9A to 9C is realized by the CPU 101 of the smartphone 100 which develops the program which is recorded in the non-volatile memory 103 to the memory 102 and executes it.

At S900, the CPU 101 accepts the user operation. If the accepted user operation is the pinch-out operation, the CPU 101 proceeds to S910, changes the zoom magnification of the picked-up image by the still-image mode, and executes the zoom-in (enlargement) processing. If the accepted user operation is the pinch-in operation, the CPU 101 proceeds to S930, changes the zoom magnification of the picked-up image by the still-image mode, and executes the zoom-out (reduction) processing. If the accepted user operation is an operation of LV end, the zoom-in/zoom-out processing shown in FIG. 9A is finished.

By referring to FIG. 9B, details of the zoom-in processing at S910 will be explained. At S911, the CPU 101 determines which of the wide-angle lens 114c, the standard lens 114b, and the telephoto lens 114a is the lens in use for the LV-display in the still-image mode. When the lens in use in the still-image mode is the wide-angle lens 114c, the processing proceeds to S912. When the lens in use in the still-image mode is the standard lens 114b, the processing proceeds to S920, and when the lens in use in the still-image mode is the telephoto lens 114a, the processing proceeds to S924.

At S912, the CPU 101 acquires a zoom position (zoom magnification) on the basis of the pinch-out operation by the user. When the zoom position by the pinch-out operation is closer to the wide side (Wide-side, wide-angle side) than the tele-end (Tele-end) of the wide-angle lens 114c, the processing proceeds to S913. When the zoom position by the pinch-out operation is closer to a tele-side (Tele side, telephoto side) than the tele-end of the wide-angle lens 114c and closer to a wide side than a wide-end (Wide-end) of the telephoto lens 114a, the processing proceeds to S914. When the zoom position by the pinch-out operation is closer to the tele side than the wide-end of the telephoto lens 114a, the processing proceeds to S916.

At S913, the CPU 101 executes the zoom-in processing by the wide-angle lens 114c and returns to S900 in FIG. 9A. The CPU 101 can execute the zoom-in processing by changing the zoom position to the position acquired at S912 by digital zoom of the picked-up image by the wide-angle lens 114c, for example.

At S914, the CPU 101 determines whether the moving image is being recorded by the standard lens 114b. If the moving image is being recorded by the standard lens 114b, the processing proceeds to S913. If the moving image is not being recorded by the standard lens 114b, the processing proceeds to S915.

At S915, the CPU 101 changes the lens to be used for the LV-display in the still-image mode to the standard lens 114b with a smaller angle of view. The CPU 101 executes the zoom-in processing by the standard lens 114b and returns to S900 in FIG. 9A. The CPU 101 can execute the zoom-in processing by changing the zoom position to the position acquired at S912 by digital zoom of the picked-up image by the standard lens 114b, for example.

At S916, the CPU 101 determines whether the moving-image is being recorded by the telephoto lens 114a. If the moving image is being recorded by the telephoto lens 114a, the processing proceeds to S915. If the moving image is not being recorded by the telephoto lens 114a, the processing moves to S917. At S917, the CPU 101 changes the lens to be used for the LV-display in the still-image mode to the telephoto lens 114a with a smaller angle of view. The CPU 101 executes the zoom-in processing by the telephoto lens 114a and returns to S900 in FIG. 9A. The CPU 101 can execute the zoom-in processing by changing the zoom position to the position acquired at S912 by digital zoom of the picked-up image by the telephoto lens 114a, for example.

At S920, the CPU 101 acquires the zoom position on the basis of the pinch-out operation by the user. If the zoom position by the pinch-out operation is closer to the wide side than the tele-end of the standard lens 114b, the processing proceeds to S921. If the zoom position by the pinch-out operation is closer to the tele side than the tele-end of the standard lens 114b, the processing proceeds to S922.

At S921, the CPU 101 executes the zoom-in processing by the standard lens 114b and returns to S900 in FIG. 9A. The CPU 101 can execute the zoom-in processing by changing the zoom position to the position acquired at S920 by digital zoom of the picked-up image by the standard lens 114b, for example.

At S922, the CPU 101 determines whether the moving image is being recorded by the telephoto lens 114a. If the moving image is being recorded by the telephoto lens 114a, the processing proceeds to S921. If the moving image is not being recorded by the telephoto lens 114a, the processing proceeds to S923.

At S923, the CPU 101 changes the lens to be used for the LV-display in the still-image mode to the telephoto lens 114a with a smaller angle of view. The CPU 101 executes the zoom-in processing by the telephoto lens 114a and returns to S900 in FIG. 9A. The CPU 101 can execute the zoom-in processing by changing the zoom position to the position acquired at S920 by digital zoom of the picked-up image by the telephoto lens 114a, for example.

At S924, the CPU 101 executes the zoom-in processing by the telephoto lens 114a and returns to S900 in FIG. 9A. The CPU 101 can execute the zoom-in processing by acquiring the zoom position on the basis of the pinch-out operation by the user and by changing the zoom position to the acquired zoom position by digital zoom of the picked-up image by the telephoto lens 114a.

By referring to FIG. 9C, details of the zoom-out processing at S930 will be explained. At S931, the CPU 101 determines which of the wide-angle lens 114c, the standard lens 114b, and the telephoto lens 114a is the lens in use for the LV-display in the still-image mode. When the lens in use in the still-image mode is the telephoto lens 114a, the processing proceeds to S932. When the lens in use in the still-image mode is the standard lens 114b, the processing proceeds to S930, and when the lens in use in the still-image mode is the wide-angle lens 114c, the processing proceeds to S935.

At S932, the CPU 101 acquires a zoom position (zoom magnification) on the basis of the pinch-in operation by the user. When the zoom position by the pinch-in operation is closer to the tele side than the wide-end of the telephoto lens 114a, the processing proceeds to S933. When the zoom position by the pinch-in operation is closer to the wide-side than the wide-end of the telephoto lens 114a and closer to the tele side than a wide-end of the standard lens 114b, the processing proceeds to S934. When the zoom position by the pinch-in operation is closer to the wide side than the wide-end of the standard lens 114b, the processing proceeds to S937.

At S933, the CPU 101 executes the zoom-out processing by the telephoto lens 114a and returns to S900 in FIG. 9A. The CPU 101 can execute the zoom-out processing by changing the zoom position to the position acquired at S932 by digital zoom of the picked-up image by the telephoto lens 114a, for example.

At S934, the CPU 101 determines whether the moving image is being recorded by the standard lens 114b. If the moving image is being recorded by the standard lens 114b, the processing proceeds to S936. If the moving image is not being recorded by the standard lens 114b, the processing proceeds to S935.

At S935, the CPU 101 changes the lens to be used for the LV-display in the still-image mode to the standard lens 114b with a wider angle of view. The CPU 101 executes the zoom-out processing by the standard lens 114b and returns to S900 in FIG. 9A. The CPU 101 can execute the zoom-out processing by changing the zoom position to the position acquired at S932 by digital zoom of the picked-up image by the standard lens 114b, for example.

At S936, the CPU 101 changes the lens to be used for the LV-display in the still-image mode to the wide-angle lens 114c with a wider angle of view. The CPU 101 executes the zoom-out processing by the wide-angle lens 114c and returns to S900 in FIG. 9A. The CPU 101 can execute the zoom-out processing by changing the zoom position to the position acquired at S932 by digital zoom of the picked-up image by the wide-angle lens 114c, for example.

At S937, the CPU 101 determines whether the moving-image is being recorded by the wide-angle lens 114c. If the moving image is being recorded by the wide-angle lens 114c, the lens in use in the still-image mode is not switched to the wide-angle lens 114c, but the processing proceeds to S938. If the moving image is not being recorded by the wide-angle lens 114c, the processing proceeds to S936.

At S938, the CPU 101 displays the notification 802 to notify the user that no more zoom-out will be performed on the display 105 as described in FIG. 8 and returns to S900 in FIG. 9A.

At S940, the CPU 101 acquires the zoom position on the basis of the pinch-in operation by the user. When the zoom position by the pinch-in operation is closer to the tele side than the wide-end of the standard lens 114b, the processing proceeds to S941. When the zoom position by the pinch-in operation is closer to the wide side than the wide-end of the standard lens 114b, the processing proceeds to S942.

At S941, the CPU 101 executes the zoom-out processing by the standard lens 114b and returns to S900 in FIG. 9A. The CPU 101 can execute the zoom-out processing by changing the zoom position to the position acquired at S940 by digital zoom of the picked-up image by the standard lens 114b, for example.

At S942, the CPU 101 determines whether the moving-image is being recorded by the wide-angle lens 114c. If the moving image is being recorded by the wide-angle lens 114c, the lens in use in the still-image mode is not switched to the wide-angle lens 114c, but the processing proceeds to S944. If the moving image is not being recorded by the wide-angle lens 114c, the processing proceeds to S943.

At S943, the CPU 101 changes the lens to be used for the LV-display in the still-image mode to the wide-angle lens 114c with a wider angle of view. The CPU 101 executes the zoom-out processing by the wide-angle lens 114c and returns to S900 in FIG. 9A. The CPU 101 can execute the zoom-out processing by changing the zoom position to the position acquired at S940 by digital zoom of the pick-up image by the wide-angle lens 114c, for example.

At S944, the CPU 101 displays the notification 802 to notify the user that no more zoom-out will be performed on the display 105 as described in FIG. 8 and returns to S900 in FIG. 9A.

At S945, the CPU 101 acquires the zoom position on the basis of the pinch-in operation by the user. When the zoom position by the pinch-in operation is closer to the tele side than the wide-end of the wide-angle lens 114c, the processing proceeds to S946. When the zoom position by the pinch-in operation is closer to the wide side than the wide-end of the wide-angle lens 114c, the processing proceeds to S947.

At S946, the CPU 101 executes the zoom-out processing by the wide-angle lens 114c and returns to S900 in FIG. 9A. The CPU 101 can execute the zoom-out processing by changing the zoom position to the position acquired at S945 by digital zoom of the picked-up image by the wide-angle lens 114c, for example.

At S947, the CPU 101 displays the notification 802 to notify the user that no more zoom-out will be performed on the display 105 as described in FIG. 8 and returns to S900 in FIG. 9A.

By referring to FIGS. 10A and 10B, processing of superimposing and displaying the picked-up image in the moving-image mode on the picked-up image in the still-image mode, which is LV-displayed (hereinafter, referred to as moving-image LV superimposed-display processing) will be explained. During the moving-image recording, if the display on the display 105 is switched to the LV-display in the still-image mode, when a direction of the camera is changed for photographing a still image, a range to be recorded in the moving image is changed.

Thus, in the third embodiment, by a predetermined operation performed by the user when the picked-up image in the still-image mode is LV-displayed, the CPU 101 causes the LV-image in the moving-image mode to be superimposed and displayed on the LV-image in the still-image mode. The predetermined operation is a panning operation, a tilting operation, a pinch-out operation, a pinch-in operation, a flick operation, or the like, for example.

Figure 10A:
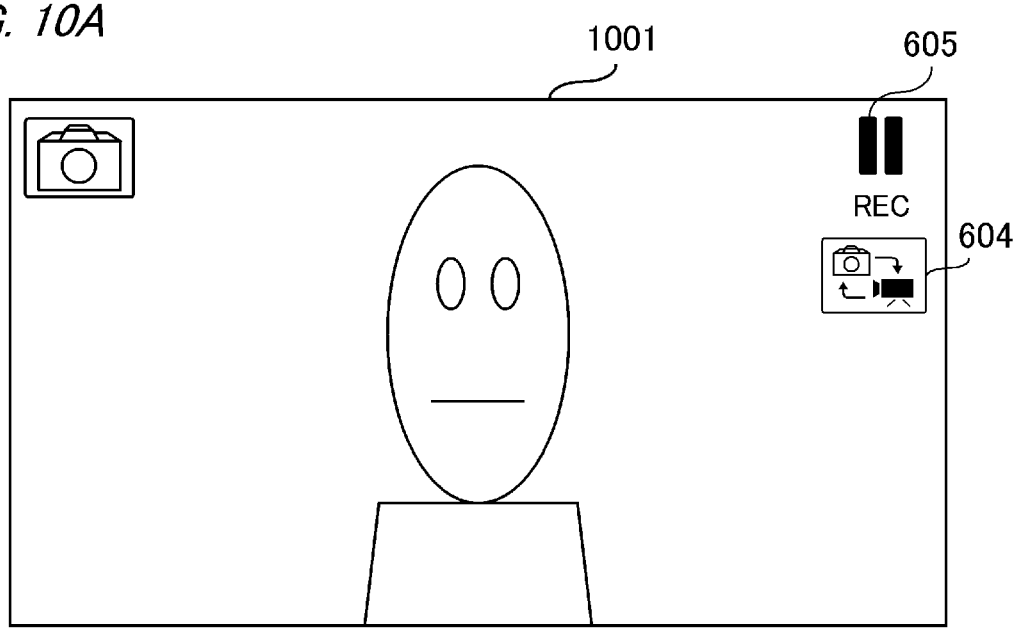
FIGS. 10A and 10B are diagrams for explaining moving-image LV superimposed-display processing in the third embodiment.

A still-image LV-display screen 1001 in FIG. 10A is a screen on which the picked-up image picked up in the still-image mode by using the telephoto lens 114a is LV-displayed on the display 105. The icon 605 indicates that the moving image is being recorded in the moving-image mode by using the lens other than the telephoto lens 114a.

Figure 10B:
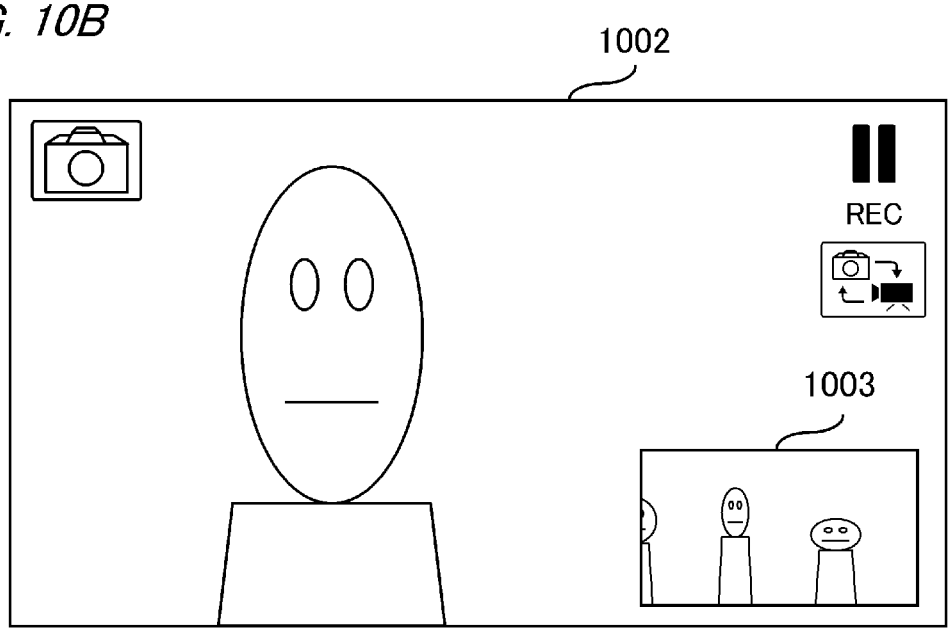

A still-image LV-display screen 1002 in FIG. 10B is a screen in which an image-pickup range was changed, and a position of the subject was moved from the still-image LV-display screen 1001 in FIG. 10A by the panning operation of the out-camera 114 by the user.

A sub screen 1003 superimposed and displayed on the still-image LV-display screen 1002 is a screen in which the picked-up image picked up in the moving-image mode by using the standard lens 114b and is being recorded as the moving image is LV-displayed. Since the picked-up image in the moving-image mode is LV-displayed on the sub screen 1003, the user can check the image pickup state (recording state) of the moving image.

Figure 11:
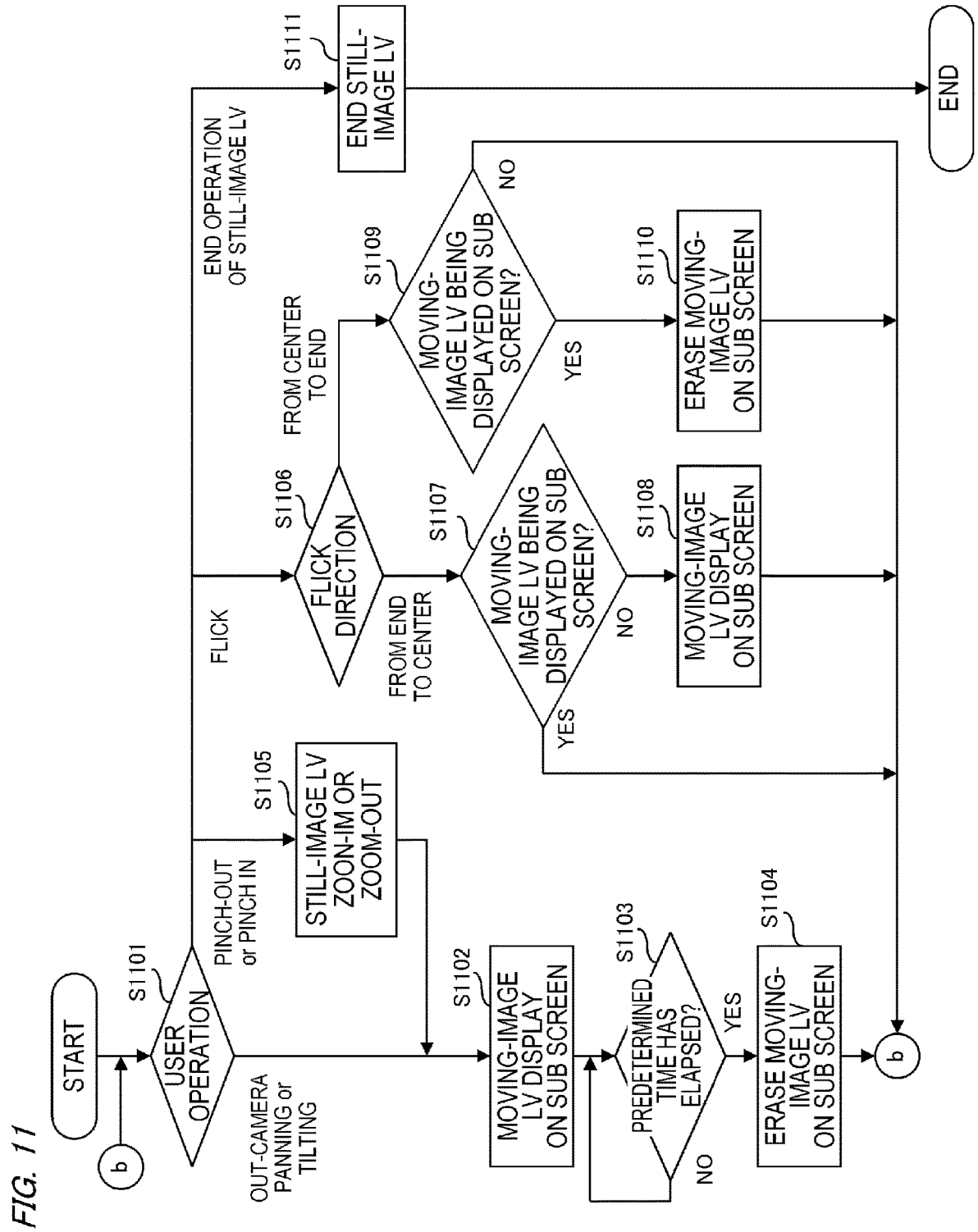
FIG. 11 is a flowchart exemplifying the moving-image LV superimposed-display processing.

FIG. 11 is a flowchart exemplifying the moving-image LV superimposed-display processing according to the third embodiment. The moving-image LV superimposed-display processing in FIG. 11 is realized by the CPU 101 of the smartphone 100 which develops the program recorded in the non-volatile memory 103 to the memory 102 and executes it.

At S1101, the CPU 101 accepts the user operation. If the accepted user operation is the panning operation or the tilting operation of the out-camera 114, the processing proceeds to S1102. If the accepted user operation is the pinch-in operation or the pinch-out operation, the processing proceeds to S1105. If the accepted user operation is the flick operation, the processing proceeds to S1106. If the accepted operation is an operation of finishing LV-display in the still-image mode, the processing proceeds to S1111.

At S1102, the CPU 101 superimposes and displays the sub screen 1003 which LV-displays the picked-up image in the moving-image mode on the still-image LV-display screen 1002 as explained in FIG. 10B. At S1103, the CPU 101 determines whether the predetermined time has elapsed since the sub screen 1003 was superimposed and displayed at S1102. If the predetermined time has elapsed, the processing proceeds to S1104. If the predetermined time has not elapsed, the CPU 101 returns to S1103 and is brought into the standby state until the predetermined time has elapsed. When the predetermined time has elapsed, at S1104, the CPU 101 erases the sub screen 1003 on which the picked-up image in the moving-image mode is LV-displayed.

At S1105, if the CPU 101 accepts the pinch-out operation at S1101, it zooms in the LV image in the still-image mode, while at S1101, if the CPU 101 accepts the pinch-in operation, it zooms out the LV-image in the still-image mode and proceeds to S1102. Since there is a possibility that the image pickup range in the moving-image mode is changed even in the case of zoom-in or zoom-out of the LV-image in the still-image mode, the CPU 101 displays the sub screen 1003 which LV-displays the picked-up image in the moving-image mode.

At S1106, the CPU 101 determines a flick direction of the flick operation accepted at S1101. If the flick direction is a direction from the end of the touch panel 106a toward the center, the CPU 101 controls to display the sub screen 1003 which LV-displays the picked-up image in the moving-image mode. On the other hand, if the flick direction is a direction from the center of the touch panel 106a toward the end, the CPU 101 controls to erase the sub screen 1003 which LV-displays the picked-up image in the moving-image mode similarly to the panning operation case.

If the flick direction is the direction from the end of the touch panel 106a toward the center, the processing proceeds to S1107. If the flick direction is the direction from the center of the touch panel 106a toward the end, the processing proceeds to S1109.

At S1107, the CPU 101 determines whether the sub screen 1003 which LV-displays the picked-up image in the moving-image mode is superimposed and displayed on the still-image LV-display screen 1002. If the sub screen 1003 is displayed, the processing returns to S1101. If the sub screen 1003 is not displayed, the processing proceeds to S1108. At S1108, the CPU 101 superimposes and displays the sub screen 1003 which LV-displays the picked-up image in the moving-image mode on the still-image LV-display screen 1002 and returns to S1101.

At S1109, the CPU 101 determines whether the sub screen 1003 which LV-displays the picked-up image in the moving-image mode is superimposed and displayed on the still-image LV-display screen 1002. If the sub screen 1003 is displayed, the processing proceeds to S1110. If the sub screen 1003 is not displayed, the processing returns to S1101. At S1110, the CPU 101 erases the sub screen 1003 which is superimposed and displayed on the still-image LV-display screen 1002 and returns to S1101.

If the operation accepted at S1101 is the operation of finishing the LV-display in the still-image mode, the processing proceeds to S1111. The operation of finishing the LV-display in the still-image mode is an operation of switching to the LV-display in the moving-image mode, for example, and is an operation of touching the LV-display switching button 604 in FIG. 10A. At S1111, the CPU 101 finishes the LV-display in the still-image mode, and the moving-image LV superimposed-display processing shown in FIG. 11 is finished.

According to the third embodiment described above, even during the moving-image recording, the user can cause the picked-up image in the still-image mode to be LV-displayed substantially on the whole display 105. As a result, the user can easily check the subject for which a still image is to be photographed and photograph a desired still image.

Moreover, the user can superimpose and display the sub screen for LV-displaying the moving image being recorded on the LV-display screen in the still-image mode by performing a predetermined operation. Even if the image pickup range in the moving-image mode is changed by the panning operation or the like for the photographing of a still image, the user can check the image pickup state of the moving image by the LV-display in the moving-image mode displayed on the sub screen.

The example in which the out-camera 114 includes a plurality of lenses with angles of view different from one another, and images are picked up by using the different lenses for the moving-image mode and the still-image mode has been explained, but this is not limiting. The out-camera 114 may include a single lens. In this case, the picked-up image in the still-image mode is generated by cutting out one frame from the picked-up image (moving image) by the moving-image mode. When the pinch-out operation or the pinch-in operation is accepted in the still-image mode, the CPU 101 can execute the zoom-in processing or the zoom-out processing by digital zoom of the cut-out image.

According to this disclosure, in the case of image pickup in a plurality of image-pickup modes in parallel, the angle of view can be seamlessly switched from the wide angle to the telephoto without interrupting the photographing.

OTHER EMBODIMENTS

The present invention has been explained in detail on the basis of the preferred embodiments thereof, but the present invention is not limited to these specific embodiments but also includes various forms within a range not departing from the gist of the present invention. A part of the aforementioned embodiments may be combined as appropriate. The case in which the present invention is applied to the smartphone was explained as an example, but this is not limiting but can be applied to any electronic device having a photographing means capable of photographing images in a plurality of image-pickup modes in parallel by using a plurality of lenses with angles of view different from each other. That is, the present invention can be applied to a digital camera, a tablet terminal, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070161, filed on Apr. 21, 2022, which is hereby incorporated by reference herein in its entirety.

What is claimed is:

1. An image pickup device having a plurality of lenses with angles of view different from one another and capable of image pickup in parallel in a first image-pickup mode and a second image-pickup mode, comprising at least one memory and at least one processor which function as:
   an accepting unit configured to accept a switching operation of switching a lens to be used for image pickup of a picked-up image which is picked up in the first image-pickup mode and displayed on a first image area, or a lens to be used for image pickup of a picked-up image which is picked up in the second image-pickup mode and displayed on a second image area; and
   a control unit configured to control such that the lens to be used for the image pickup is switched in response to an acceptance of the switching operation of the lens to be used for the image pickup of the picked-up image which is displayed on the first image area or the image pickup of the picked-up image which is displayed on the second image area, wherein
   the control unit controls such that lenses to be used in the first image-pickup mode and the second image-pickup mode are switched such that different lenses are used in the first image-pickup mode and the second image-pickup mode; and
   the accepting unit includes a first item which is superimposed and displayed on a picked-up image displayed on the first image area and switches a lens used in the first image-pickup mode and a second item which is superimposed and displayed on a picked-up image displayed on the second image area and switches a lens used in the second image-pickup mode.

2. The image pickup device according to claim 1, wherein when a first lens is used in the first image-pickup mode and a second lens is used in the second image-pickup mode, if the switching operation of switching the lens used in the first image-pickup mode to the second lens is accepted, the control unit controls such that the lens used in the second image-pickup mode is switched to a third lens different from the first lens and the second lens, and the lens used in the first image-pickup mode is switched to the second lens.

3. The image pickup device according to claim 1, wherein when a first lens is used in the first image-pickup mode and a second lens is used in the second image-pickup mode, if the switching operation of switching the lens used in the first image-pickup mode to a third lens different from the first lens and the second lens is accepted, the control unit controls such that the lens used in the first image-pickup mode is switched to the third lens, and the lens used in the second image-pickup mode remains to be the second lens.

4. The image pickup device according to claim 1, wherein when the accepting unit accepts the switching operation of the lens used in the second image-pickup mode, the accepting unit controls such that the switching to the lens in use in the first image-pickup mode is not accepted.

5. The image pickup device according to claim 4, wherein when the accepting unit accepts the switching operation of the lens used in the first image-pickup mode, the accepting unit controls such that the switching to the lens in use in the first image-pickup mode can be also accepted.

6. The image pickup device according to claim 1, wherein when a moving image is not being recorded in the first image-pickup mode, the control unit controls such that the lens used in the first image-pickup mode can be switched from the lens in use to another lens, while when a moving image is being recorded in the first image-pickup mode, the lens used in the first image-pickup mode is not switched.

7. The image pickup device according to claim 1, wherein the accepting unit displays an item for accepting a switching operation of a lens used in image pickup together with a picked-up image picked up in the first image-pickup mode on a display unit of the image pickup device and accepts the switching operation in response to an operation to the item.

8. The image pickup device according to claim 1, wherein the accepting unit includes a first item which is superimposed and displayed on a picked-up image in the first image-pickup mode and switches a lens used in the first image-pickup mode and a second item which is superimposed and displayed on a picked-up image in the second image-pickup mode and switches a lens used in the second image-pickup mode.

9. The image pickup device according to claim 1, wherein the accepting unit includes a third item which is superimposed and displayed on a picked-up image in the first image-pickup mode and switches a lens used in each of the first image-pickup mode and the second image-pickup mode, respectively; and
the control unit is configured to:
   switch a lens used in the first image-pickup mode to a selected lens in a case where an operation to the third item is an operation by a single-touch at one spot; and switch the lens used in the second image-pickup mode to the selected lens in a case where an operation to the third item is an operation by a multi-touch at two spots or more.

10. The image pickup device according to claim 1, wherein
when a moving image is being recorded in the first image-pickup mode, the accepting unit does not include the lens in use in the first image-pickup mode in candidates for a lens which can be switched in the second image-pickup mode.

11. The image pickup device according to claim 1, wherein
the accepting unit:
accepts an operation of setting the first image-pickup mode to a priority image-pickup mode with priority over the second image-pickup mode; and
does not include the lens in use in the first image-pickup mode set to the priority image-pickup mode in candidates for a lens which can be switched in the second image-pickup mode.

12. The image pickup device according to claim 11, wherein
an operation of setting the priority image-pickup mode is an operation of touch-move of a picked-up image in the image-pickup mode of a setting target to an area on which a picked-up image in the priority image-pickup mode is displayed.

13. The image pickup device according to claim 11, wherein
an operation of setting the priority image-pickup mode is an operation of changing a direction of a display of the image pickup device, and an image-pickup mode set in advance in accordance with the direction of the display is set as the priority image-pickup mode.

14. The image pickup device according to claim 1, wherein
the accepting unit includes a fourth item for photographing a still image which can be moved between on a picked-up image in the first image-pickup mode and on a picked-up image in the second image-pickup mode; and
the control unit is configured to control to:
photograph a still image by a lens in use in the first image-pickup mode in a case where the fourth item is on the picked-up image in the first image-pickup mode; and
photograph a still image by a lens in use in the second image-pickup mode in a case where the fourth item is on the picked-up image in the second image-pickup mode.

15. An image pickup device capable of image pickup in a plurality of image-pickup modes, comprising at least one memory and at least one processor which function as:
a display control unit configured to live-view display any one of picked-up images picked up in the same direction in parallel in the plurality of image-pickup modes; and
an accepting unit configured to accept a switching operation of switching between live-view display of a first picked-up image in a first picked-up image and live-view display of a second picked-up image in a second picked-up image, wherein
the display control unit live-view displays the first picked-up image in the first image-pickup mode and, when the switching operation is accepted while a moving image is being recorded in the first image-pickup mode, live-view displays the second picked-up image in the second image-pickup mode while a recording of the moving image in the first image-pickup mode is continued.

16. The image pickup device according to claim 15, wherein
the image pickup device has a plurality of lenses with angles of view different from one another and picks up images by using different lenses for the first image-pickup mode and the second image-pickup mode.

17. The image pickup device according to claim 15, wherein
the image pickup device has a single lens; and
the second picked-up image is generated by being cut out from the first picked-up image.

18. The image pickup device according to claim 15, wherein
the accepting unit includes a fifth item for switching the image-pickup mode to be a target of the live-view display; and
the switching operation is an operation of touching the fifth item.

19. The image pickup device according to claim 15, wherein
the switching operation is an operation of double-tap or touch-move on the first picked-up image which is live-view displayed; and
the display control unit live-view displays an image of an area including a position or a subject which was double-tapped or touch-moved as the second picked-up image.

20. The image pickup device according to claim 15, wherein
the accepting unit accepts a pinch-out operation or a pinch-in operation for the second picked-up image which is live-view displayed; and
the display control unit enlarges or reduces the second picked-up image by a zoom magnification acquired on the basis of the pinch-out operation or the pinch-in operation.

21. The image pickup device according to claim 20, wherein
the image pickup device has a plurality of lenses with angles of view different from one another; and
the at least one memory and the at least one processor further function as a control unit configured to control such that:
when the zoom magnification becomes a magnification closer to a telephoto side than a tele-end of a lens in use in the second image-pickup mode by the pinch-out operation, the lens in the second image-pickup mode is switched to a lens with a smaller angle of view; and
when the zoom magnification becomes a magnification closer to a wide-angle side than a wide-end of a lens in use in the second image-pickup mode by the pinch-in operation, the lens in the second image-pickup mode is switched to a lens with a wider angle of view.

22. The image pickup device according to claim 21, wherein
the control unit executes control such that the lens in use in the second image-pickup mode is not switched to a lens in use in the first image-pickup mode.

23. The image pickup device according to claim 15, wherein
when the second picked-up image is live-view displayed, the display control unit causes the first picked-up image being recorded as the moving image to be superimposed on the second picked-up image and live-view displayed.

24. The image pickup device according to claim 23, wherein
in a case where a predetermined operation is accepted, the display control unit causes the first picked-up image to be superimposed on the second picked-up image and live-view displayed.

25. The image pickup device according to claim 24, wherein
the predetermined operation is a panning operation, a tilt operation, a pinch-out operation, a pinch-in operation, or a flick operation.

26. An image pickup device having a plurality of lenses with angles of view different from one another and capable of image pickup in parallel in a first image-pickup mode and a second image-pickup mode, comprising at least one memory and at least one processor which function as:
an accepting unit configured to accept a switching operation of switching a lens to be used for image pickup of a picked-up image which is picked up in the first image-pickup mode and displayed on a first image area, or a lens to be used for image pickup of a picked-up image which is picked up in the second image-pickup mode and displayed on a second image area; and
a control unit configured to control such that the lens to be used for the image pickup is switched in response to an acceptance of the switching operation of the lens to be used for the image pickup of the picked-up image which is displayed on the first image area or the image pickup of the picked-up image which is displayed on the second image area, wherein
the control unit controls such that lenses to be used in the first image-pickup mode and the second image-pickup mode are switched such that different lenses are used in the first image-pickup mode and the second image-pickup mode;
the accepting unit includes a third item which is superimposed and displayed on a picked-up image in the first image-pickup mode and switches a lens used in each of the first image-pickup mode and the second image-pickup mode, respectively; and
the control unit is configured to:
switch a lens used in the first image-pickup mode to a selected lens in a case where an operation to the third item is an operation by a single-touch at one spot; and
switch the lens used in the second image-pickup mode to the selected lens in a case where an operation to the third item is an operation by a multi-touch at two spots or more.

27. A control method of an image pickup device having a plurality of lenses with angles of view different from one another, comprising the steps of:
accepting a switching operation of switching a lens to be used for image pickup of a picked-up image which is picked up in the first image-pickup mode and displayed on a first image area, or a lens to be used for image pickup of a picked-up image which is picked up in the second image-pickup mode and displayed on a second image area, when an image is picked up in a first image-pickup mode and a second image-pickup mode in parallel; and
controlling such that the lens to be used for the image pickup is switched in response to an acceptance of the switching operation of the lens to be used for the image pickup of the picked-up image which is displayed on the first image area or the image pickup of the picked-up image which is displayed on the second image area, wherein
in the controlling step, control is executed such that lenses to be used in the first image-pickup mode and the second image-pickup mode are switched such that different lenses are used in the first image-pickup mode and the second image-pickup mode, and
in the accepting step, a first item which switches a lens used in the first image-pickup mode is superimposed and displayed on a picked-up image displayed on the first image area, and a second item which switches a lens used in the second image-pickup mode is superimposed and displayed on a picked-up image displayed on the second image area.

* * * * *